Figure 1:
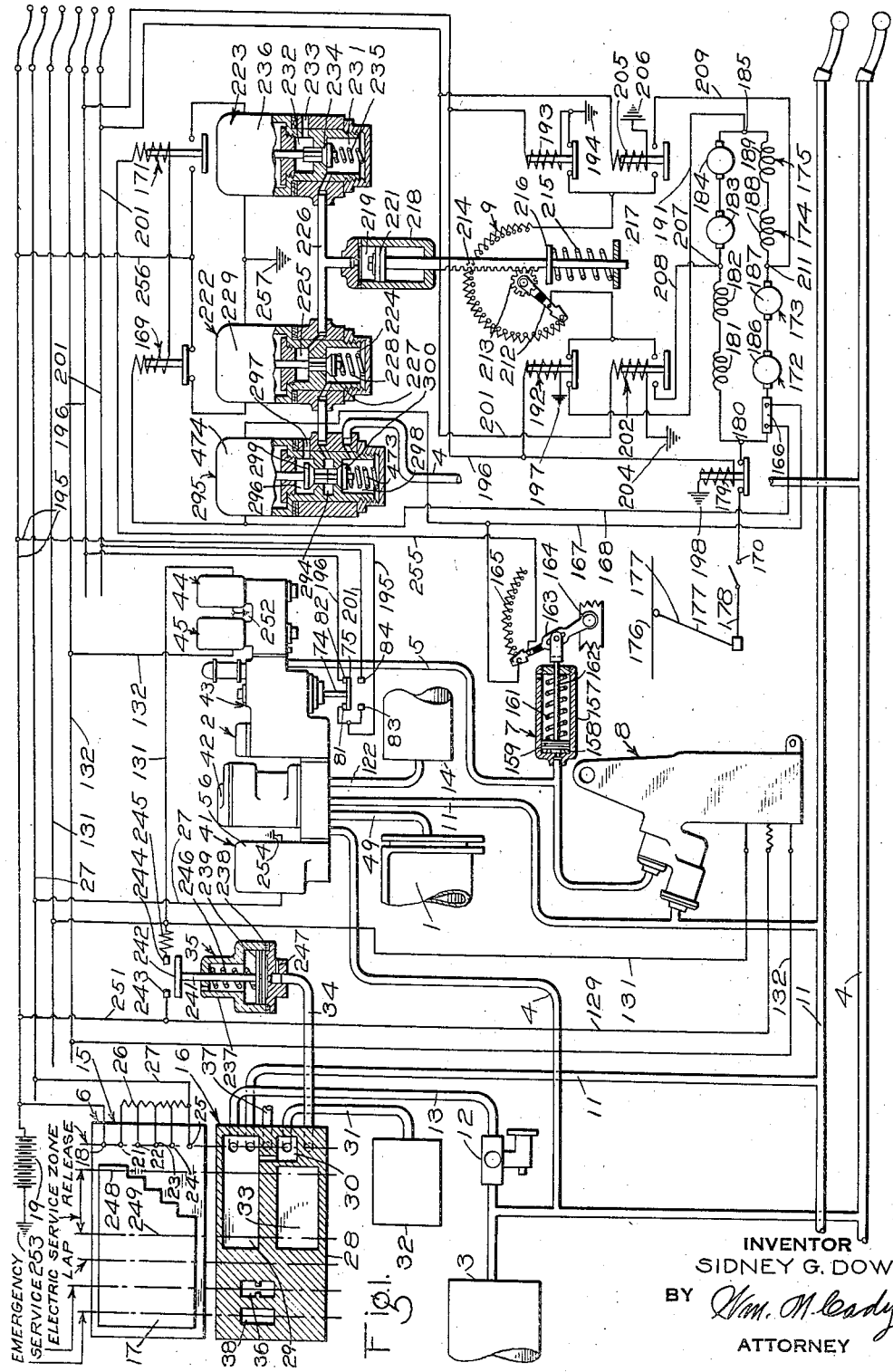

Dec. 28, 1937.     S. G. DOWN     2,103,323
BRAKE SYSTEM FOR HIGH SPEED TRAINS
Filed June 18, 1935     8 Sheets-Sheet 2

INVENTOR
SIDNEY G. DOWN
BY Wm. M. Cady
ATTORNEY

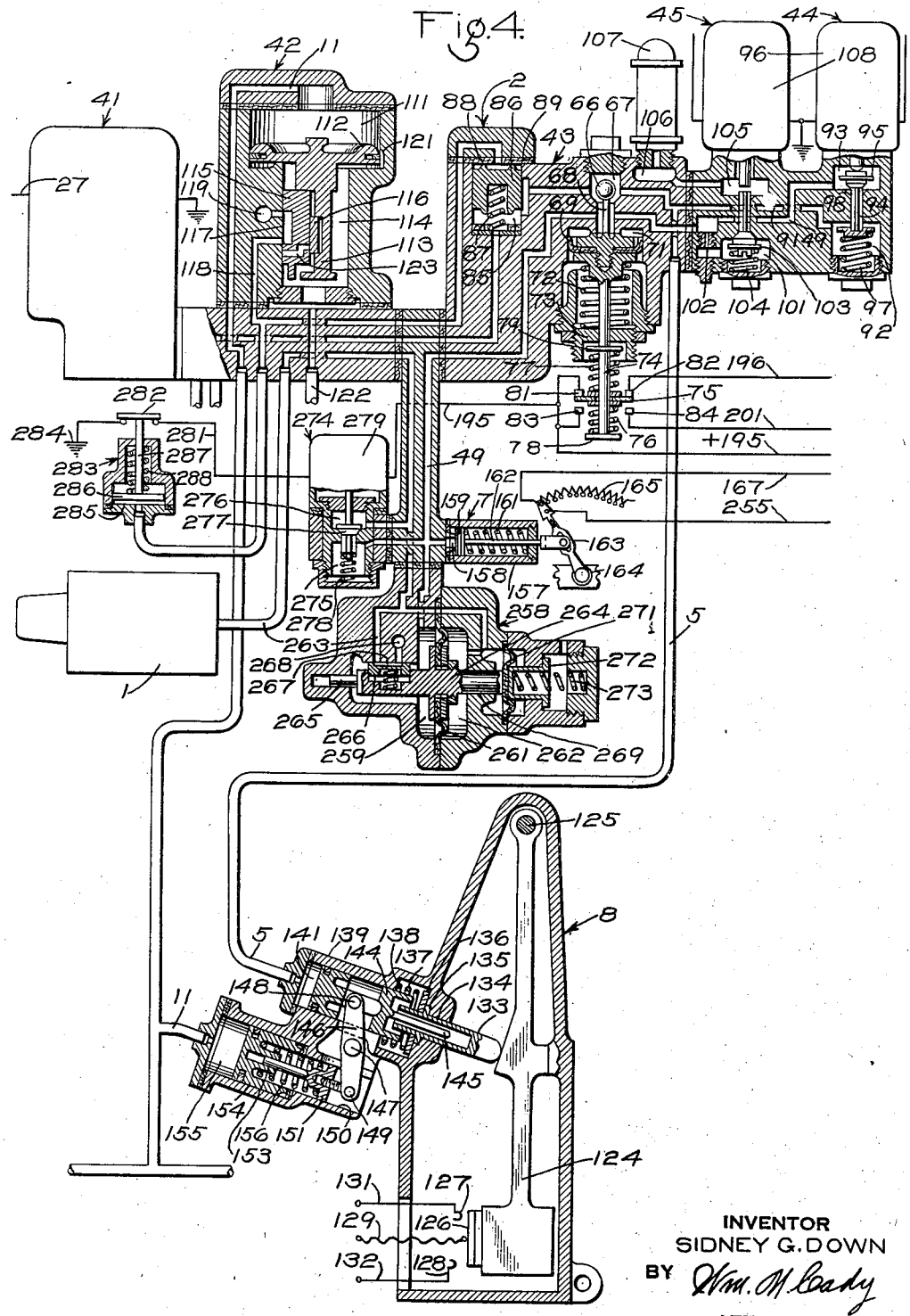

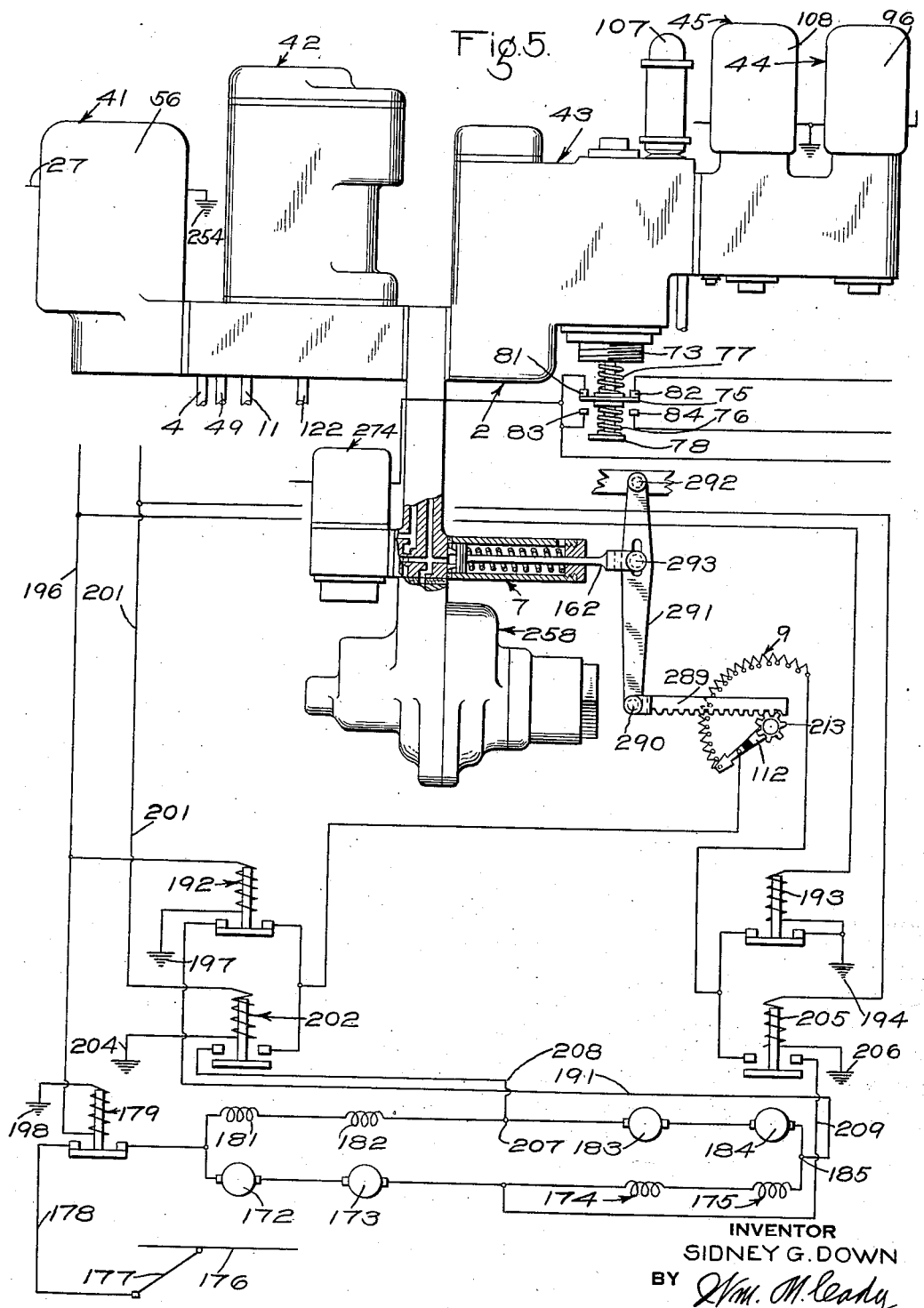

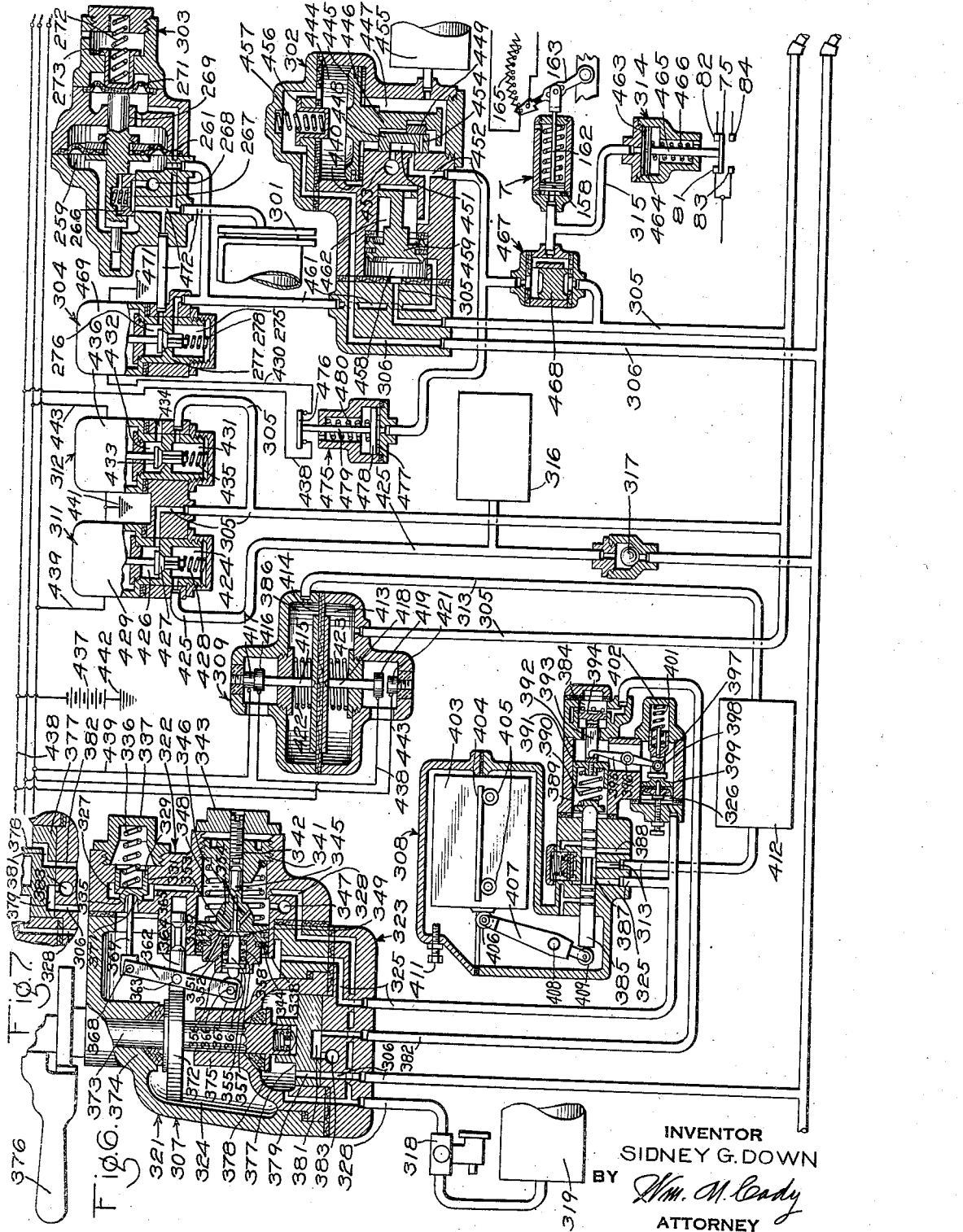

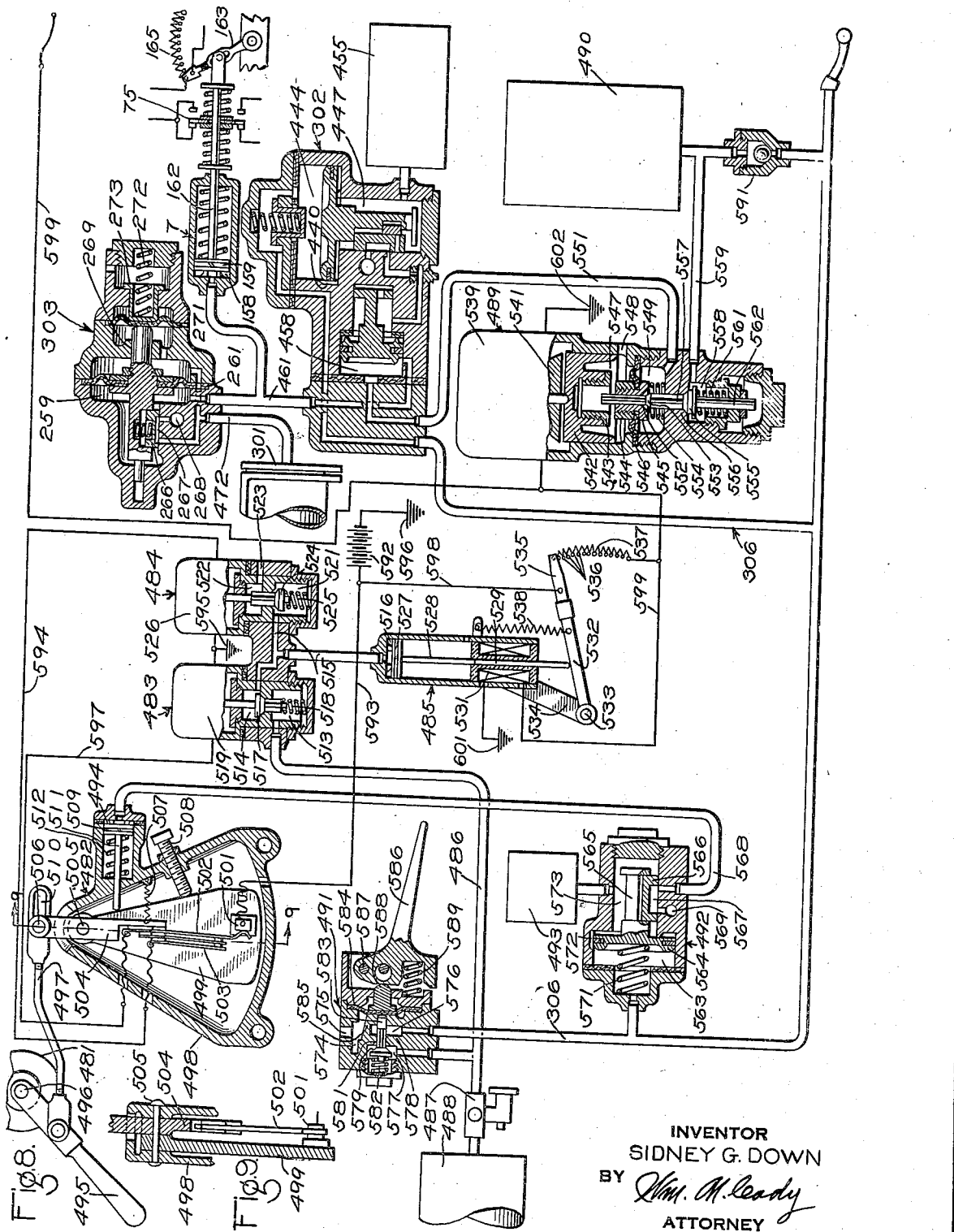

Dec. 28, 1937.     S. G. DOWN     2,103,323
BRAKE SYSTEM FOR HIGH SPEED TRAINS
Filed June 18, 1935     8 Sheets-Sheet 7
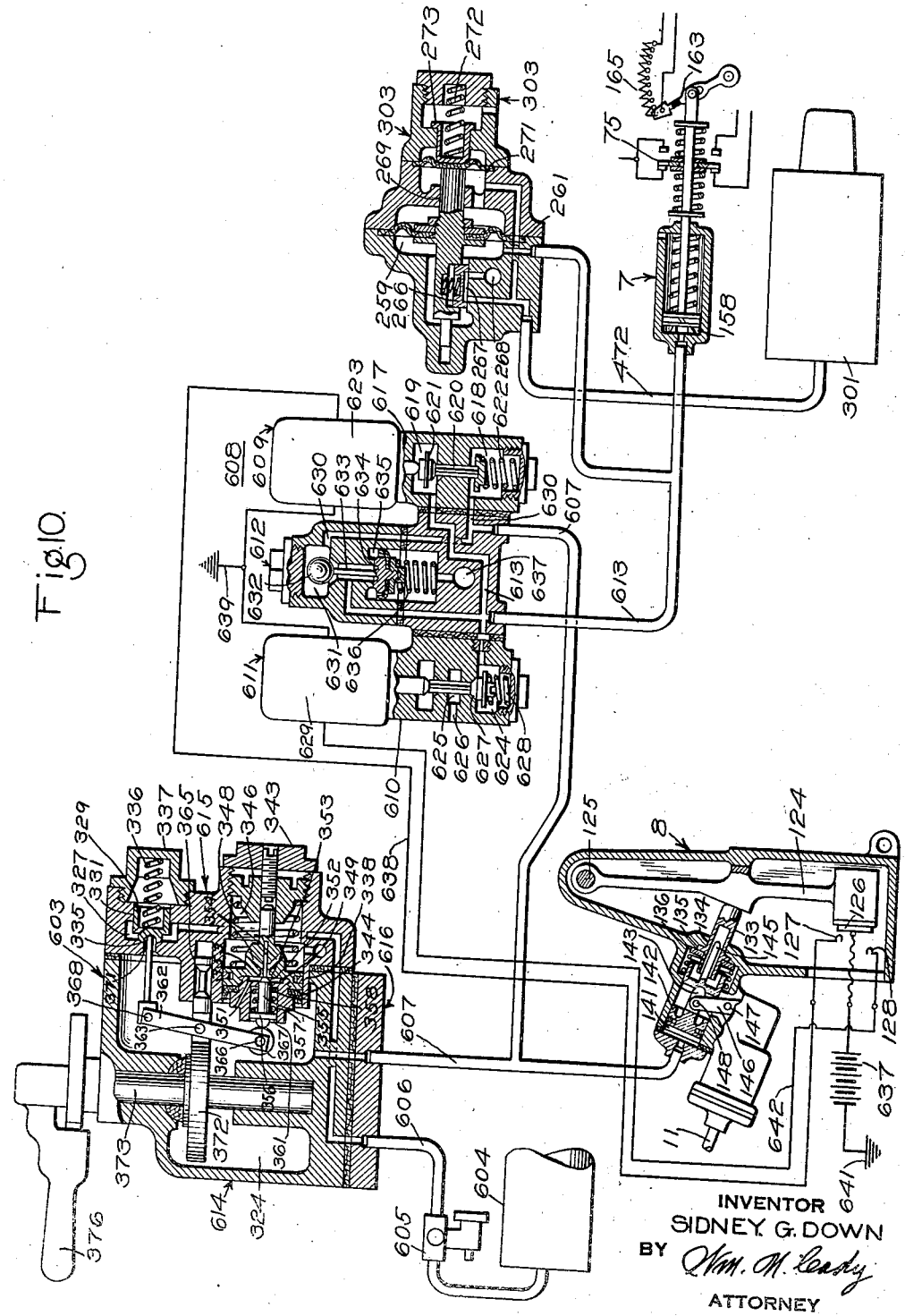
INVENTOR
SIDNEY G. DOWN
BY Wm. M. Cady
ATTORNEY

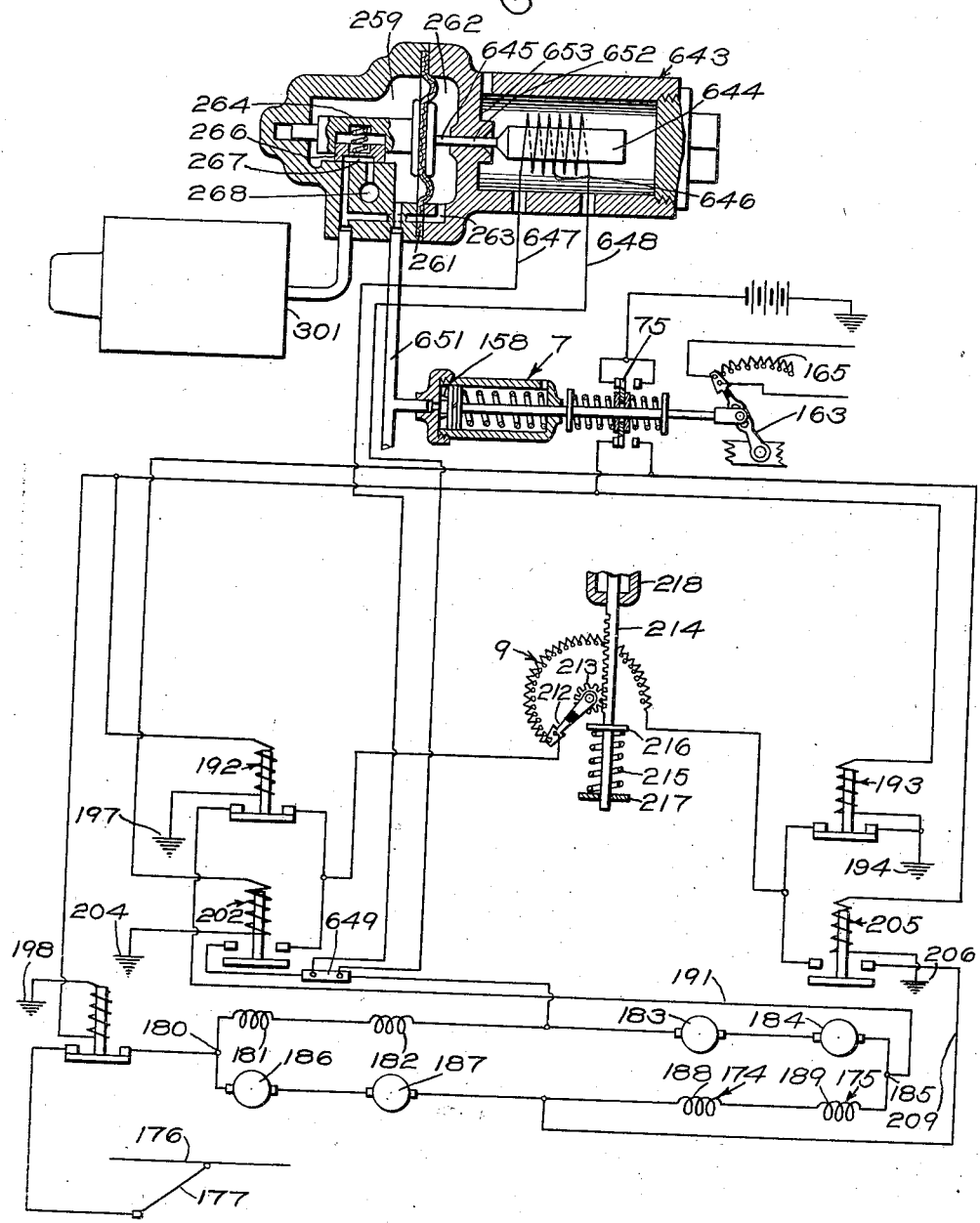

Patented Dec. 28, 1937

2,103,323

UNITED STATES PATENT OFFICE 2,103,323

BRAKE SYSTEM FOR HIGH SPEED TRAINS

Sidney G. Down, Edgewood, Pa., assignor to The Westinghouse Air Brake Company, Wilmerding, Pa., a corporation of Pennsylvania Application June 18, 1935, Serial No. 27,171

32 Claims. (Cl. 303—3)

My invention relates to braking equipment for railway vehicles and is particularly adapted for use on high speed traction vehicles driven by electric motors.

In the operation of high speed trains and similar vehicles it is desirable to provide a brake equipment having ample braking capacity to take care of the most rigid service the equipment may be called upon to meet. It is well known that for a given braking pressure friction type brakes which operate on the rims of the vehicle wheels are less effective in retarding the motion of a vehicle at high speeds than at low speeds because the coefficient of friction between the rubbing parts is lower at high speeds than at low speeds. On the other hand, an electrodynamic type of brake, such for example as an eddy current type brake, or car motors operated to produce a retarding torque on the vehicle wheels, is more effective at the high speeds than at the low speeds. In order to stop high speed trains and vehicles in a relatively short space it is desirable that a braking equipment be provided which combines the characteristics of these two types of brakes.

It is further desirable that the train or vehicle be decelerated smoothly and at a selected rate of retardation. For this purpose it is proposed to provide a retardation controller for regulating the degree of application of the brakes. This may comprise an inertia responsive device such as a pendulum that assumes various positions in accordance with variations in the deceleration of the vehicle and is adapted by means of electric circuits, or otherwise, to control the degree of application of the brakes.

It is an object of my invention to provide braking equipment for railway vehicles in which a plurality of braking means are provided that are controlled from a common brake controlling device in accordance with a desired degree of braking.

It is a further object of my invention to provide a braking system in which a plurality of brakes are employed and in which a retardation controller is employed for controlling all of the brakes in accordance with a desired rate of retardation of the vehicle.

It is another object of my invention to provide a retardation controlled braking system employing a fluid pressure brake and an electric brake, and in which the braking force of one brake is withheld so long as the braking force of the other is capable of producing the desired rate of retardation.

It is a further object of my invention to provide a retardation controlled braking system having a fluid pressure brake and a dynamic brake in which both brakes are controlled to give a predetermined required total braking, the two brakes being independent but having an interlocking control such that the dynamic brakes automatically control the fluid pressure brake to limit the degree of application thereof to the value necessary to effect the desired rate of retardation.

Figure 2:
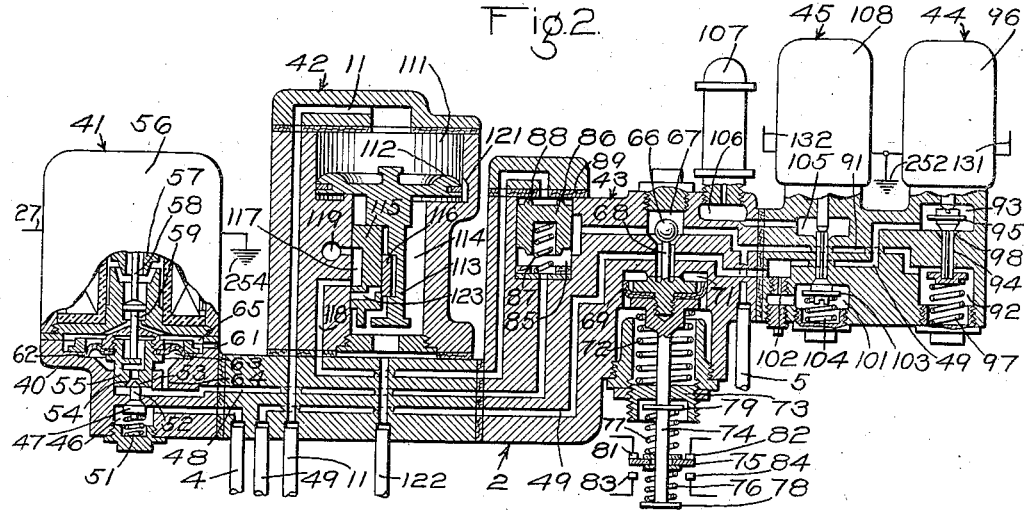
Figure 3:
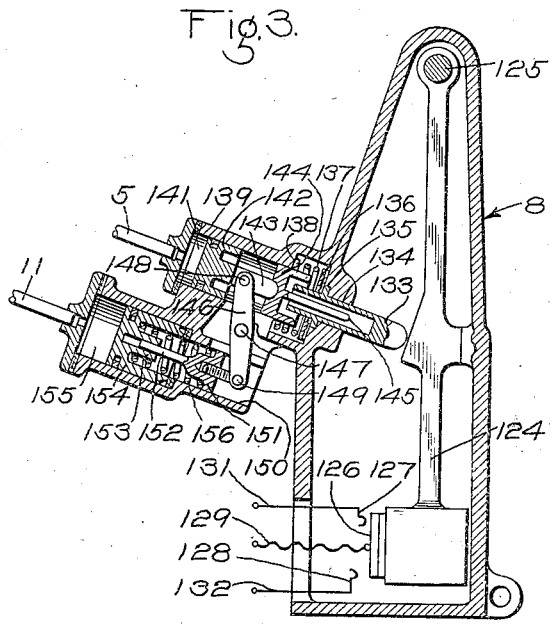

Other objects and advantages of my invention will be apparent from the following description of several preferred emboidments thereof when taken in connection with the accompanying drawings, in which, Fig. 1 is a diagrammatic view of apparatus and circuits illustrating one preferred embodiment of my invention, Fig. 2 is a diagrammatic sectional view of the control valve device used in the embodiment of the invention illustrated in Fig. 1, Fig. 3 is a diagrammatic sectional view of the retardation controller device employed in the embodiment illustrated in Fig. 1, Fig. 4 is a diagrammatic sectional view of a modified control valve device and retardation control device employed in another embodiment of my invention, Fig. 5 is a diagrammatic view of a further modification of the control valve device and rheostat mechanism for controlling the dynamic brake employed in another embodiment of my invention, Fig. 6 is a diagrammatic view of another embodiment of my invention in which means is provided for equalizing the pressures on all pressure regulators of the equipment, Fig. 7 is a detail view showing the relation of the connecting passages through the brake valve device illustrated in Fig. 6 when the brake valve device is in its emergency position, Fig. 8 is a diagrammatic view of apparatus illustrating another embodiment of the invention in which a braking system is provided having a manually adjustable retardation controller employed as a brake valve device and controlling the several braking units through operation of their separate self-lapping magnet valve devices, Fig. 9 is a detail sectional view taken along the line 9—9 of Fig. 8, Fig. 10 is a diagrammatic view of another brake system illustrating a different embodiment of the invention in which a self-lapping brake valve is employed for determining the degree of application of the brakes, Fig. 11 is a diagrammatic view of another brake system illustrating an embodiment of the invention in which a solenoid loaded valve device responsive to the degree of dynamic braking is employed as the interlocking element between the two braking means.

Referring to the drawings and more particularly to the embodiment illustrated in Figs. 1, 2 and 3 thereof, the brake apparatus illustrated is that employed on one vehicle unit, but it will be understood by those skilled in the art that portions of both apparatus and the dynamic brake apparatus illustrated are duplicated on each car or braking unit of the train or vehicle.

The apparatus comprises a brake cylinder 1 by means of which the friction brakes are applied upon the flow of fluid under pressure thereto, as controlled by the control valve device 2, from the main reservoir 3 through main reservoir pipe 4. The flow of fluid under pressure from the main reservoir to a pressure control pipe 5 is determined by the position of a brake valve device 6 which determines the setting of the pressure regulator 7 and of the retardation controller 8. The setting of the retardation controller 8 determines the rate of retardation of the vehicle as a whole, and the setting of the pressure regulator 7 determines the degree of application of the dynamic brakes by controlling operation of a rheostat indicated generally at 9. A brake pipe 11 is provided for effecting automatic operation of the brakes, and for charging the auxiliary reservoir 14 through the triple valve portion of the control valve device 2, and is charged with fluid under pressure as supplied by the feed valve device 12 from the main reservoir 3 through pipe 13 and the rotary valve portion of the brake valve device 6.

The brake valve device 6 is shown diagrammatically in developed form and comprises a drum controller portion 15 for controlling the electropneumatic or straight air operation of the brakes, and a rotary valve portion 16 for controlling the automatic operation of the brakes. The drum controller portion 15 comprises a conducting segment 17 that is adapted to engage the contact finger 18 connected to the positive terminal of a battery 19 and one or more of the contact fingers 21, 22, 23, 24 and 25, depending upon the position of the segment 17 within the electric service zone, for controlling the amount of the resistor 26 that is connected in circuit between the conducting segment 17 of the brake valve device and the conductor 27 through which current is supplied to the self-lapping magnet valve portion of each of the control valve devices 2.

The rotary valve portion 16 comprises a rotary valve 28 containing a cavity 29 that is adapted to connect the brake pipe 11 to be supplied with fluid under pressure from the main reservoir 3 through feed valve device 12 and pipe 13 when the brake valve device 6 is in its release position or in any position within the electric service application zone. An extension 30 of the cavity 29 also permits the supply of fluid under pressure from the main reservoir to the timing reservoir 32 through the pipe 31 when the brake valve device 6 is in its release position. A cavity 33 is provided in the valve 28 for connecting the timing reservoir 32 through pipes 31 and 34 to the piston chamber in the pressure operated switch 35 when the brake valve device 6 is in any position within the electric service application zone. The rotary valve 28 is also provided with a cavity 36 for connecting the brake pipe 11 to the exhaust port 37 through a restricted opening to effect a gradual reduction in brake pipe pressure when the brake valve device 6 is placed in its pneumatic service application position, and with a cavity 38 for connecting the brake pipe 11 to the exhaust port 37 for effecting a rapid decrease in brake pipe pressure when the brake valve device 6 is placed in its emergency application position.

Each control valve device 2 may correspond to that illustrated and described in the copending application of Clyde C. Farmer and Ellis E. Hewitt for Electropneumatic brake equipment, Serial No. 726,324, filed May 18, 1934, and assigned to the same assignee as this application, but as here illustrated is somewhat simplified in that the relay valve portion, the volume reservoir, and supply reservoirs are omitted. Each of the control valve devices 2 is controlled in part by the brake valve device 6 and in part by the retardation controller device 8. The control valve device is best shown in Fig. 2 and comprises a self-lapping magnet valve portion 41, a triple valve portion 42, an inshot valve portion 43, and a magnet valve portion comprising the cut-off magnet valve device 44 and the release magnet valve device 45.

The self-lapping magnet valve portion 41 comprises a casing 40 enclosing a valve chamber 46 containing the supply valve 47 that is adapted to control the flow of fluid under pressure from the main reservoir 3 to the brake cylinder through main reservoir pipe 4, valve chamber 46, passage 48, the inshot valve portion 43 and the magnet valve portion of the control valve device 2, and by passage and pipe 49 to the brake cylinder 1. The supply valve 47 is urged to its seat by a spring 51 contained in the valve chamber 46 and is provided with an upwardly extending stem 52, the upper end of which terminates in a release valve 53 for engaging a seat 54 on a sliding member 55. The magnet 56 is provided in the upper end of the casing and when energized the core 57 thereof, and a stem 58 are forced downwardly, the stem 58 engaging a pin 59 adapted to force the sliding member 55 downwardly to cause engagement between the valve seat 54 and the valve 53 on the upper end of the stem 52 to force the supply valve 47 from its seat against the force of the spring 51. When the sliding member 55 is moved upwardly, thus separating the release valve seat 54 from the release valve 55, the passage 48 leading from the brake cylinder as above described is connected to the atmosphere through the exhaust port 61.

The sliding member 55 is normally held in an upper or release position by a resilient diaphragm 62 which is secured thereto and to the casing embodying the self-lapping valve device 41, to form a chamber 63 therebelow, that is connected to the passage 48 through passage 64, and a chamber 65 thereabove.

When the supply valve 47 is forced downwardly from its seat upon energization of the magnet 56, pressure is allowed to build up in the passage 48 leading to the brake cylinder and in the chamber 63 on the under side of the diaphragm 62 until the upward force on this diaphragm is equal to the downward force of the magnet stem 58. Should the pressure in the chamber 63 fall below the force necessary to equalize the pressure of the magnet stem 58, the supply valve 47 will be again forced from its seat to effect the further supply of fluid under pressure to the brake cylinder and to the chamber 63, and should the pressure in the chamber 63 increase above the downward force of the self-lapping magnet, the sliding member 55 will be forced upwardly until the seat 54 disengages the release valve 53 thus permitting the release of fluid under pressure from the brake cylinder and from the chamber 63 through the exhaust port 61 to thus maintain a pressure within the brake cylinder and within the chamber 63 corresponding to the downward force of the magnet 56.

The inshot valve portion 43 is provided with a ball valve 66 positioned in a valve chamber 67. A stem 68 is provided for unseating the ball valve and is attached to a piston 69 contained in a piston chamber 71, the lower side of which is open to the atmosphere. A spring 72 is provided for urging the piston 69 upwardly and an adjusting member 73 is provided for adjusting the spring. A downwardly extending stem 74 is connected to the piston 69 and passes through a central opening in the adjusting member 73 for carrying a switch contact member 75 that is biased between spring members 76 and 77, positioned respectively between collars 78 and 79 and the switch contact member 75 to bias the switch contact member to a mid-position between the collars. The movable switch contact member 75 is adapted to engage the stationary switch contact members 81 and 82 in its upper or illustrated position, and the stationary contact members 83 and 84 when in its lower position to close circuits to be later described.

The ball valve chamber 67 is in communication with a double check valve chamber 85 containing a double check valve 86 that is normally urged to its upper or illustrated position by a spring 87 to maintain communication between the passage 48 and the ball valve chamber 67 to permit the supply of fluid from the self-lapping magnet valve device 41 to the ball valve chamber and the release of fluid under pressure therefrom. In its illustrated position the upper valve seat 88 of the double check valve 86 is sealed against the gasket 89, cutting off communication between the ball valve chamber 67 and the triple valve device 42.

When fluid under pressure is permitted to flow from the main reservoir pipe 4 past the self-lapping magnet valve device 41 into the passage 48 and to the ball check valve chamber 67, a portion of this fluid passes the unseated ball valve 66 to the passage 49 and thence to the brake cylinder, and a portion continues through the passage 91, the chamber 92, the cut-off magnet valve chamber 93 of the cut-off magnet valve device 44, and passage and pipe 49 to the brake cylinder. As the pressure within the passage 49 and the piston chamber 71 of the inshot valve device increases to a predetermined value, depending upon the setting of the spring 72, the piston 69 is forced downwardly against the force of the spring 72, permitting the ball valve 66 to seat, thus closing communication from the valve chamber 67 to the passage 49 past the valve 66. Communication to the brake cylinder is effected thereafter through the chambers 92 and 93 of the cut-off magnet valve device 44.

The cut-off valve device 44 comprises a casing enclosing the above mentioned chambers 92 and 93 connected by a passage 94, the chamber 93 containing a cut-off valve 95 adapted when forced downwardly by the magnet 96 against the pressure of a spring 97 to engage the valve seat 98.

The release magnet valve device 45 contains a release valve chamber 101, that is connected through a restricted port 102 to the passage 49, and contains a release valve 103 that is normally urged to its seated position by a spring 104. The release valve 103 controls communication between the release valve chamber 101 and the chamber 105 that is in communication with the chamber 106 of the safety valve device 107, so that when the release valve 103 is urged from its seat, fluid under pressure is released from the passage 49 through the restricted port 102 to the atmosphere until the pressure is reduced to a value determined by the setting of the safety valve device 107. A magnet 108 is provided in the device 45 for urging the valve stem and the valve 103 downwardly from its seat against the pressure of the spring 104.

The supply of fluid under pressure to, and the release of fluid under pressure from, the brake cylinder may also be controlled by the triple valve portion 42 of the control valve device in accordance with a reduction in brake pipe pressure. The triple valve portion comprises a casing enclosing a piston chamber 111 containing a piston 112 having a downwardly extending stem 113 positioned in a slide valve chamber 114, below the piston, and adapted to operatively engage a main slide valve 115 and a graduating valve 116 contained within the slide valve chamber 114. The graduating valve 116 moves simultaneously with the piston stem 113 and the main slide valve 115 moves with a delayed action.

The piston chamber 111 is in communication with the brake pipe 11 by way of passage 11. When the pressure in the brake pipe is normal or maintained at a predetermined value the piston 112 is in its lowermost, or illustrated position, which is the release position of a triple valve device. In this position a cavity 117 in the main slide valve 115 connects a passage 118 communicating with the double check valve, with the exhaust port 119.

In release position the slide valve chamber 114 is charged from the piston chamber 111 through the charging groove 121 in the wall of the piston chamber that leads past the piston 112. The auxiliary reservoir 14 is connected to the slide valve chamber 114 by pipe 122 and is charged from the slide valve chamber 114.

When the pressure in the piston chamber 111 is reduced at a service rate the piston 112 moves upwardly due to the pressure on the underside of the piston caused by the fluid under pressure at a greater pressure in the auxiliary reservoir and slide valve chamber. As the piston stem 113 moves upwardly the graduating valve 116 is moved to uncover the end of the port 123 through the main slide valve 115, and the main slide valve 115 is then moved upwardly until the port 123 registers with the end of the passage 118, thus supplying fluid under pressure from the auxiliary reservoir 14 through passage 118, past the double check valve 86 and the ball check valve chamber 67 and to the brake cylinder through the passages above described. As the pressure in the passage 118 increases, the pressure on the upper side of the double check valve 86 correspondingly increases, thus forcing the valve 86 downwardly against the pressure of the spring 87 and permitting the flow of fluid under pressure from the passage 118 past the check valve 86. When the pressure on both sides of the piston 112 are substantially equalized, the graduating valve 116 will move downwardly to lap the end of the port 123, thus cutting off the flow of fluid under pressure to the brake cylinder.

When the pressure in the piston chamber 111 is reduced at an emergency rate the piston 112 and the stem 113 move upwardly sufficiently to cause the lower end of the main slide valve 115 to uncover the end of the passage 118, thus permitting a more rapid supply of fluid under pressure from the slide valve chamber 114 to the passage 118.

The retardation controller device 8 comprises a pendulum or inertia device 124 that is pivotally mounted on the pin 125 and carries a movable contact member 126 that is adapted to engage contact members 127 and 128. The movable contact member 126 is connected by a conductor 129 to the positive terminal of the battery 19, the fixed contact member 127 is connected by a conductor 131 to the winding of the cut-off magnet valve device 44, and the fixed contact member 128 is connected by conductor 132 to the winding 108 of the release magnet valve device 45. The pendulum 124 is urged to its illustrated or vertical position by a plunger 133 that extends through an opening 134 in the casing of the retardation controller device and carries a flange 135 that engages the underside of a collar 136 that is biased toward the right by a spring 137 that extends between the collar 136 and a shoulder 138 in the outwardly extending wall 139 of the casing structure. The portion 139 of the casing structure encloses a piston chamber 141 containing a piston 142 having an inwardly extending stem 143 that engages a slide member 144 provided with an inwardly extending stem 145 within a bore in the plunger 133. Upon the application of pressure to the piston 142 the stem 143 forces the slide member into engagement with the end of the plunger 133, thus increasing the force opposing the movement of the pendulum 124, and requiring a corresponding greater rate of retardation of the vehicle to create a force of inertia in the pendulum 124 that is sufficient to cause it to swing against the force of the plunger 133 to its contact closing positions.

A rocker arm 146 is mounted by the pivot pin 147 in the casing of the retardation controller device and is connected by a pin 148 to the stem 143 of the piston 142. The lower end of the lever 146 is connected by a pivot 149 to a slide member 151 mounted within a bore 150 within the casing portion of the retardation controller device and is provided with a stem 152 disposed within a hollow bore within a stem 153 of a piston 154 that is mounted within a piston chamber 155 that is connected to the brake pipe 11. A spring 156 is provided between the piston 154 and the slide member 151 for normally urging the lower end of the lever 146 toward the right. So long as normal brake pipe pressure is maintained within the brake pipe 11 and within the piston chamber 155 the piston 154 is forced to its extreme right hand or illustrated position. In this position a maximum force is exerted through the spring 156 and the lever 146 against the force exerted by the piston 142, thus limiting that force to a minimum to effect a minimum rate of retardation of the vehicle, as determined by the force of the piston 142 and of the spring 137 against the plunger 133.

The piston chamber 141 is connected by the pressure controlling pipe 5 to the passage 91 extending from the ball valve chamber 67 to the lower chamber 92 of the cut-off magnet valve device 44, and when the brakes are applied by movement of the brake valve device 6 to any position within its electric service application zone, the pressure within the ball check valve chamber 67 will be determined by the amount of movement of the brake valve device 6 from its release position, the pressure supplied to the valve chamber 67 and the piston chamber 141 of the retardation controller device 8 determining the total braking force called for. As the pressure within the piston chamber 141 increases, it tends to rotate the lever 146 in a clockwise direction against the pressure within the piston chamber 155 that is exerted through the spring 156, an amount determined by the degree of increase in pressure within the piston chamber 141, thus increasing the force required to be exerted by the pendulum 124 against the plunger 133 above the minimum force exerted by the spring 137, to a greater force that is determined by the relative pressures within the piston chambers 141 and 155. It will be seen, therefore, that an increase in the pressure within the chamber 141 or a decrease of pressure in the chamber 155 changes the setting of the retardation controller device to require that an increased forward force be exerted by the pendulum 124 toward the left in order to effect engagement of the contact member 126 with the contact members 127 and 128.

The pressure regulating device 7 comprises a casing 157 providing a piston chamber 158 connected to the brake controlling pipe 5 and containing a piston 159 that is urged toward the left by a spring 161, one end of which engages the piston 159 and the other end of which engages the outer end of the casing structure. The piston 159 is provided with a stem 162 extending through the outer end of the casing structure and connected to a rheostat arm 163 that is pivotally supported by the pin 164, for varying the amount of the resistor 165 that is in circuit with a dynamic braking shunt 166 that supplies current through conductors 167 and 168 to the windings of current limiting relays 169 and 171 in accordance with the dynamic braking current flowing through the rheostat 9.

Vehicle driving motors 172, 173, 174 and 175 are provided and are supplied with power from the overhead conductor 176 through trolley 177, conductor 178, a power controller indicated diagrammatically at 170, the line circuit breaker 179 in its circuit closing position, to the junction point 180 where the circuit divides, one branch of the circuit extending through the field windings 181 and 182 of the motors 172 and 173, respectively, and the armature windings 183 and 184 of the motors 174 and 175, respectively, to the junction point 185. The other branch of the circuit extends from the junction point 180 through the armature windings 186 and 187 of the driving motors 172 and 173, respectively, and the field windings 188 and 189 of the driving motors 174 and 175, respectively, to the junction point 185. From the junction point 185 the circuit is completed through conductor 191, the contact members of the power circuit relay 192, through the rheostat 9 and the power circuit relay 193 to ground at 194. The energizing circuits for the power circuit relays 192 and 193 and of the line contactor 179, which are maintained energized and in their circuit closing positions when the brake mechanism is in its release position, extend from the positive terminal of the battery 19 through conductor 195, switch contact members 81, 75 and 82 on the inshot valve device, conductor 196 through the several branch circuits leading, respectively, through the winding of the relay 193 to ground at 194, through the winding of the relay 192 to ground at 197, and through the winding of the relay 179 to ground at 198.

Upon application of the brakes the initial amount necessary to effect movement of the inshot valve device to permit seating of the ball valve 66 and the downward movement of the stem 74 to effect movement of the switch contact member 75 from engagement with the contact members 81 and 82 and into engagement with the switch contact members 83 and 84, the above traced circuit for energizing the line contactor 179 and the power relays 192 and 193 is interrupted, and these relays drop to their circuit interrupting positions thus interrupting the flow of power through the motors 172, 173, 174 and 175. A circuit is now completed extending from the positive terminal of the battery 19 through conductor 195, the switch contact members 83, 75, and 84 of the inshot valve device, conductor 201, through the winding of the dynamic braking relay 202 to ground at 204, and through the winding of the dynamic braking relay 205 to ground at 206, thus causing the dynamic braking relays 202 and 205 to be energized and actuated to their upper, or circuit closing, positions. The relays 202 and 205, in their circuit closing positions, complete a circuit from the junction point 207 of the motor circuit through conductor 208, the dynamic braking relays 202, the resistor of the rheostat 9, dynamic braking relay 205 and by conductor 209 to the junction point 211 of the motor circuit. The motors now operate as generators for supplying energy to the resistor 9 of the dynamic brake rheostat thus effecting a dynamic braking action.

The dynamic braking rheostat 9 is provided with a movable contact arm 212 that is actuated by any suitable means such as the pinion 213 and the rack 214 that is normally biased to its upper position by the spring 215, that is positioned between a collar 216 on the rack or stem 214 and a fixed abutment 217. An operating cylinder 218 is provided containing a piston chamber 219 containing a piston 221 connected to the stem or rack 214 and actuated in accordance with the operation of an application magnet valve device 222 and a release magnet valve device 223. The application magnet valve device 222 comprises a casing containing a valve chamber 224 that is in constant communication with a chamber 294 within a magnet valve device 295, and a chamber 225 that is in constant communication through pipe 226 with the piston chamber 219. The application valve chamber 224 contains an application valve 227 that is normally urged upwardly to its seat by spring 228, and is adapted to be forced downwardly from its seat by a magnet 229 in the upper portion of the casing of the valve device 222. The release magnet valve device 223 is provided with a casing containing a release valve chamber 231 that is in constant communication with the piston chamber 219 through the pipe 226 and a release chamber 232 that is in constant communication with the atmosphere through the exhaust port 233. The chamber 231 contains a release valve 234 that is normally urged upwardly to its seat by the spring 235 and is adapted to be moved downwardly from its seat against the force of the spring 235 by a magnet 236 in the upper portion of the casing.

The magnet valve device 295 is connected between the application magnet valve device 222 and the straight air pipe 4 and comprises a casing containing the aforenamed chamber 294, a release valve chamber 296 that is in constant communication with the atmosphere through the exhaust port 297, and an application valve chamber 298 that is in constant open communication with the straight air pipe 4. A release valve 299 is provided in the release valve chamber 296 and application valve 300 is provided in the application valve chamber 298. These valves are provided with connecting valve stems and are urged upwardly by the spring 473 within the application valve chamber to force the valve 300 to its seat and the release valve 299 from its seat and are adapted to be forced downwardly against the spring 473 upon the energization of the winding of a magnet 474 in the upper part of the casing structure.

The pressure operated switch 35 comprises a casing 237 enclosing a piston chamber 238 containing a piston 239 from which a piston stem 241 extends upwardly to carry the movable contact member 242 of a switch that is adapted to engage the fixed contact members 243 and 244 for closing a circuit through the resistor 245 and the winding of the cut-off magnet valve device 44. A spring 246 is provided for normally pressing the piston 239 and the stem 241 downwardly to its illustrated position. A choke 247 or restricted exhaust port is provided for permitting the flow of fluid from the piston chamber 238 to the atmosphere to permit the gradual release of fluid under pressure from the piston chamber 248 so that the switch contact 242 will operate to its circuit interrupting position after a predetermined time to interrupt a circuit through the magnetic valve device 44.

The operation of the system illustrated in Figs. 1, 2 and 3 will now be described. Fluid at main reservoir pressure is available, through the main reservoir pipe 4, at the application valve chamber 46 of the self-lapping magnetic valve portion 41 of the control valve devices 2 on each brake unit. With the brake valve device 6 in its illustrated, or release, position fluid under pressure flows to the brake pipe 11 as supplied from the main reservoir 3 through the feed valve 12, pipe 13, and the cavity 29 in the rotary valve 28. Fluid under pressure flows from the brake pipe 11 to the piston chamber 155 of the retardation controller device 8, to hold the piston 154 against the bias of the springs 156 and to rotate the lever 146 in a counterclockwise direction to effect a setting of the retardation controller corresponding to a minimum desired rate of retardation of the vehicle. Fluid under pressure also flows from the brake pipe 11 through the piston chamber 111 of the triple valve portion 42 of the control valve device 2, past the feed groove 121 in the piston chamber wall to the slide valve chamber 114, and by pipes 122 to the auxiliary reservoir 14, thus charging the auxiliary reservoir and the slide valve chamber to brake pipe pressure. Fluid under pressure also flows from the cavity 29 to the portion 30 of the rotary valve 28 to the timing reservoir 32 by pipe 31 charging the timing reservoir to brake pipe pressure.

When the operator wishes to make a service application of the brakes, the brake valve device 6 is moved to a position within its electric service application zone represented by the vertical lines 248 and 249 on the diagram of the brake valve device in Fig. 1. It will be noted that for any position of the brake valve device within its electric service application zone fluid under pressure is continued to be supplied to the brake pipe 11 through the cavity 29 in the rotary valve 28. As the brake valve device reaches the position represented by the vertical line 248 the contact members 18 and 21 engage the contact segment 17, and at the same time a communication is established through the cavity 33 of the rotary valve 28 between the timing reservoir 32 and the piston chamber 238 of the pressure operated switch 35, thus causing the operation of the switch to its circuit closing position to complete a circuit to the cut-off magnet valve device 44 from the positive terminal of the battery 19, through conductor 251, contact members 243, 242 and 244 of the pressure operated switch, resistor 245, conductor 231, the winding 96 of the cut-off magnet valve device 44, to ground at 252, and to the grounded terminal 253 of the battery 19. The cut-off magnet valve device 44 is thus energized independently of the operation of the retardation controller device 8, but after a predetermined length of time, depending upon the time required to discharge the timing reservoir 32 through the choke 247, the switch contact member 242 is forced downwardly by the springs 246 to interrupt the above traced circuit, and thus deenergize the cut-off magnet valve device.

The engagement of the contact members 18 and 21 with the conducting segments 17 causes a circuit to be completed from the positive terminal of the battery 19 through a resistor 26, conductor 27, the winding of the magnet 56 of the self-lapping magnet valve portion 41 of the control valve device 2, to ground at 254, and to the grounded terminal 253 of the battery 19, thus energizing the magnet 56. As the brake valve device 6 is moved further from its release position through the electric service application zone, causing the contact members 22, 23, 24 and 25 to successively engage the conducting segment 17, increasing portions of the resistor 26 is shunted from the circuit to the magnet 56 of the self-lapping magnet valve portion, thus correspondingly increasing the degree of energization of this magnet and consequently the downward force of the magnet core 57 and the pin 59.

As above explained the downward force of the stem 58 against the pin 59 causes the sliding member 55 to be actuated downwardly to effect a seating of the release valve 53 against its seat 54 and to move the stem 52 downwardly to unseat the application valve 47 and permit the flow of fluid pressure from the main reservoir pipe 4 to the passage 48, and to the chamber 63 beneath the diaphragm 62, until the pressure therein builds up to a value corresponding to the downward force of the magnet 56. Thus the pressure within the passage 48 depends upon the degree of energization of the magnet 56. As the pressure builds up in the chamber 63, fluid under pressure flows past the ball valve 66, through the brake cylinder passage and pipe 49 to the brake cylinder 1, until the pressure within the piston chamber 71 of the inshot valve device builds up to a value sufficient to force the piston 69 downwardly against the force of the spring 72 to cause the ball valve 66 to seat. Since, as above explained, the pressure operated switch 35 is moved to its circuit closing position to energize the windings of the magnet 96 of the cut-off valve device 44 upon movement of the brake valve 6 from its release position, the valve 95 is seated and remains seated so long as the pressure operated switch 35 remains in its circuit closing position. The pressure within the brake cylinder is thus prevented from building up above the value required to cause the seating of the ball valve 66, say ten pounds, until sufficient time has elapsed to reduce the pressure within the timing reservoir 32 sufficiently to permit the pressure operated switch 35 to operate to its circuit interrupting position to deenergize the winding of the magnet 96 and permit the valve 95 to be operated to its illustrated position. This gives time for the dynamic brake to be applied as controlled by the pressure regulator 7 and its effect to be felt at the retardation controller prior to application of the fluid pressure brake, thus avoiding an undesirable momentary surge "overcast" that might occur if both brakes were applied together before the retardation controller can become effective to limit the degree of application of the brakes.

While the valve 95 is maintained seated, thus preventing the fluid pressure in the brake cylinder from increasing above a predetermined amount as controlled by the inshot valve device, the pressure is allowed to build up in the ball valve chamber 67 and in the brake control pipe 5 to a value corresponding to the movement of the brake valve device 6 from its release position, and the degree of energization of the self-lapping magnet valve portion 56, to effect a pressure within the pipe 5 corresponding to the desired rate of braking. The purpose of preventing the fluid pressure from building up immediately in the brake cylinder 1 is to provide time for effecting the application of the dynamic brakes through operation of the regulator 7, the piston chamber 158 of which is supplied with fluid under pressure at brake control pipe pressure, causing the piston 159 to be moved toward the right against the bias of the spring 161 an amount depending upon the pressure within the pipe 5 to effect a corresponding operation of the rheostat arm 163, and a corresponding increase in the amount of the resistor 165 that is included in the circuit between the shunt 166 and the current limiting relays 169 and 171 to correspondingly increase the dynamic braking current required to effect an upward operation of the relays 169 and 171.

When the pressure within the ball valve chamber 67 builds up to a value causing movement of the piston 69 downwardly to allow seating of the ball valve 66 the switch element 75 is moved out of engagement with the switch contact members 81 and 82, thus interrupting the above traced circuits through the line contactor 179 and the power relays 192 and 193 to effect operation of these switches to their circuit interrupting positions, and is moved into engagement with the contact members 83 and 84 to effect the closure of a circuit through the windings of the dynamic braking relays 202 and 205, causing them to be operated upwardly to their circuit closing positions.

Upon closure of the dynamic braking relays 202 and 205 current will flow from the shunt 166 through conductor 167, the resistor 165, conductor 255, the windings of the current limiting relays 171 and 169 and conductor 168 to the other terminal of the shunt 166 to control the positions of the relays 169 and 171. Current also flows from conductor 167 through the winding of the magnet 474 of the magnet valve device 295 forcing the release valve 299 to its seat to close communication from chamber 294 to the atmosphere and forcing valve 300 from its seat to effect the supply of fluid under pressure from the main reservoir pipe 4 to the application valve chamber 224. In the illustrated positions of the relays 169 and 171 fluid under pressure will flow from the chamber 224, past the unseated application valve 227, through pipe 226 to the piston chamber 219 of the cylinder 218, thus forcing the piston 221 and the rack 214 downwardly to cause rotation of the rheostat arm 212 in a clockwise direction to decrease the resistance in circuit with the motors 172, 174, and 175 to thereby increase the rate of dynamic braking. As the rate of dynamic braking increases, the current flowing through the windings of the relays 169 and 171 increases until the energization of the relays becomes sufficient to cause them to be operated upwardly, thus interrupting the circuit from the positive terminal of the battery 19 through conductor 195, conductor 256, the contact members of the current limiting relay 169, the winding of the magnet 229 to ground at 257 and to the grounded terminal 253 of the battery 19, thus permitting the spring 228 to seat the application valve 227 and prevent further increase of pressure within the piston chamber 219. At a very small further increase in current through the circuit of the windings of the relays 169 and 171, the energization of the winding of the relay 171 will increase sufficiently to cause that relay to be operated upwardly to its circuit closing position, thus completing a circuit from the battery 19 through conductor 195, conductor 256, the contact member of the current limiting relay 171, the winding of the magnet 236 to ground at 257, and to the grounded terminal 253 of the battery 19, thus causing the release valve 234 to be moved downwardly from its seat and permit the escape of fluid under pressure from the piston chamber 219 to the atmosphere through the exhaust port 233 to permit the upward movement of the piston 221 and the rack 214 under the influence of the spring 215, thus effecting a counterclockwise operation of the rheostat arm 212 to decrease the dynamic braking rate until the current flowing from the shunt 166 through the windings of the current limiting relays 169 and 171 has decreased sufficiently to permit the relay 171 to drop to its lower or illustrated position.

As the pressure within the piston chamber 141 of the retardation controller device 8 increases the lever 146 is biased in a clockwise direction, thus adding a force, in addition to that effected by the spring 137, against the force of the plunger 133, thus increasing the force of inertia required by the pendulum 124 to effect engagement of the contact member 126 with the contact members 127 and 128 to effect an increase in the rate of retardation of the vehicle.

After the initial period during which the cut-off valve 95 is maintained in its seated position by operation of the pressure operated switch 35, as described above, the valve 95 will be forced upwardly by the spring 97 permitting the flow of fluid under pressure from the ball valve chamber 67 through passage 91, chambers 92 and 93, brake cylinder passage and pipe 49, to the brake cylinder 1. The brake cylinder pressure therefore builds up to effect an increasing application of the brakes until the pendulum 124 is forced sufficiently toward the left to cause engagement between the contact members 126 and 127, to close a circuit from the positive terminal of the battery 19 through conductor 129, contact members 126 and 127, conductor 131, the winding of the magnet 96 of the cut-off magnet valve device 44 to ground at 252 and to the grounded terminal 253 of the battery 19, thus energizing the winding of the cut-off magnet valve device to force the valve 95 to its seat to prevent further increase in the brake cylinder pressure. Should the rate of retardation of the vehicle increase further, or sufficiently for the contact member 126 of the retardation controller device to engage the contact member 128, a circuit will be completed from the positive terminal of the battery 19 through conductor 129, the contact members 126 and 128 of the retardation controller device, conductor 132 and the winding of the magnet 108 of the release magnet valve device 45 to ground at 252 and to the grounded terminal 253 of the battery 19, thus energizing the magnet of the release magnet valve device to force the release valve 103 downwardly from its seat to effect the release of fluid under pressure from the brake cylinder 1 through the brake cylinder pipe and passage 49, the restricted choke 102, the release valve chamber 101, the chamber 105, and the chamber 106 of the safety valve device 107 to the atmosphere until the pressure within the chamber 106, and within the brake cylinder, has been reduced to a value determined by the setting of the safety valve device 107.

If, for any reason, the operator desires to effect a pneumatic service application of the brakes, as for example in case of failure of the electrical control circuit, the brake valve device 6 is moved to the position indicated in the diagram in Fig. 1 as pneumatic service position in which position the cavity 36 effects communication between the brake pipe 11 and the exhaust port 37 to effect a reduction in brake pipe pressure at a restricted rate and hence a corresponding reduction in pressure within the piston chamber 111 of the triple valve portion 42 of the control valve device 2. As the pressure within the piston chamber 111 decreases the overbalancing pressure in slide valve chamber 114 moves the piston and the piston stem 113 upwardly causing the graduating valve 116 to uncover the inner end of the port 123 through the main slide valve 115 and moving the main slide valve 115 upwardly until the port 123 registers with the end of the passage 118 thus effecting the supply of fluid under pressure from the auxiliary reservoir 14 through the pipe 122 to the upper side of the double check valve 86, forcing the check valve downwardly against the force of a spring 87 and permitting the supply of fluid under pressure to flow to the valve chamber 67 of the inshot valve device. Fluid under pressure then flows from the ball valve chamber 67 to the brake cylinder 1, past the unseated ball valve 56 and past the unseated cut-off valve 95 in the manner above described, except as limited by operation of the retardation controller which becomes effective to limit the degree of application of the brakes when the braking force has increased sufficiently to cause the desired rate of retardation of the vehicle.

Should the operator desire to effect an emergency application of the brakes, the brake valve device 6 is moved to the position indicated in the diagram as emergency application position, thus bringing the cavity 38 in the rotary valve 28 to effect communication between the brake pipe 11 and the exhaust port 37 to effect a rapid rate of decrease in brake pipe pressure, and a correspondingly rapid rate of decrease in the pressure within the triple valve piston chamber 111, to effect an upward movement of the piston 112 and of the piston stem 113 to its extreme upper position so that the main slide valve 115 is moved clear of the end of the passage 118 to effect a more rapid rate of flow of fluid under pressure from the auxiliary reservoir 14 to the ball valve chamber 67 and to the brake cylinder 1 as above described.

When the brake valve device 6 is moved from its release position to either its pneumatic service application position or its pneumatic emergency application position, the piston chamber 238 of the pressure operated switch 35 is not placed in communication with the timing reservoir 32 so that the switch does not operate to close a circuit through the magnet of the cut-off magnet valve device 44, and thus does not prevent the immediate building up of pressure within the brake cylinder 1 to a value corresponding to the pressure within the ball valve chamber 67, except when limited by the retardation controller. This effects a more rapid rate of application of a pneumatic brake than when the brake valve device is moved to a position within the electric service application zone.

Referring to Fig. 4, the embodiment of the invention therein illustrated corresponds, in its essential elements, to that illustrated in Figs. 1, 2 and 3 and includes a control valve device 2 having a self-lapping magnet portion 41, a triple valve portion 42, an inshot valve portion 43, a cut-out valve device 44 and a release magnet valve device 45 that are similar to the correspondingly numbered elements of the control valve device 2 illustrated in Figs. 1 and 2. The self-lapping magnet valve portion 41 is controlled by a brake valve device 6 and circuits corresponding to those shown in Fig. 1, and the switch attached to the stem 74 of the inshot valve portion, comprising the switch contact members 75, 81, 82, 83 and 84, controls the dynamic braking and power relays in the same manner as in Fig. 1, and the pressure regulator 7 operates to vary the resistance of a resistor 165 in circuit with the current limiting relays 169 and 171 of Fig. 1. In the embodiment of the invention disclosed in Fig. 4 the pneumatic adjustment of the retardation controller 8 is determined by the pressure within the brake control pipe 5 which corresponds with the pressure within the valve chamber 67 of the inshot valve portion, but the pressure within the piston chamber 158 of the pressure regulator 7, instead of corresponding to that within the brake control pipe 5, corresponds to the pressure within the passage 49 that is connected to the cut-off valve chamber 93, and the pressure operated switch 35 shown in Fig. 1 is omitted from the system illustrated in Fig. 4, so that the pressure within the passage 49 in Fig. 4 may build up to the pressure within the ball valve chamber 67, except as this is limited by operation of the retardation controller 8 to actuate the cut-off valve 95 to its seat.

The control valve device 2 shown in Fig. 4, instead of permitting an immediate application of the fluid pressure brakes to a predetermined amount as does the control valve in Fig. 2, is provided with a differential relay valve portion 258 connected between the passage 49 and the brake cylinder 1 to prevent the passage of fluid under pressure to the brake cylinder until the pressure within the passage 49 has risen to some predetermined value, such as one-half the pressure that is supplied by the self-lapping magnet valve portion 41 when the brake valve is in full service position.

The differential relay valve portion 258 comprises a casing containing a chamber 259, bounded on one side by a diaphragm 261, the chamber being in constant communication with the cut-off valve chamber 93 through the passage 49, and also containing a chamber 262 on the other side of the diaphragm that is in constant communication, through passage and pipe 263, with the brake cylinder 1. A stem 264 is attached to the diaphragm 261 and is provided with a narrow portion 265 that slides within a bore in the wall of the casing structure and carries a slide valve 266 provided with a cavity 267 for connecting the passage 263 to the atmosphere through the exhaust port 268. The other end of the stem 264 extends through a bore 269 in a wall in the casing structure and abuts against a diaphragm 271 forming one wall of the chamber 262 and the other side of which engages a plunger or graduating stem 272 that is forced toward the left by a spring 273.

A by-pass magnet valve device 274 is associated with the differential relay valve 258 and comprises a casing containing a chamber 275 that is in open communication with the passage 49, and a valve chamber 276 that is in open communication with the brake cylinder 1 through the passage and pipe 263 and contains the by-pass valve 277 that is urged upwardly from its seat by a spring 278 in the chamber 275, and downwardly against its seat by the magnet 279 in the upper part of the casing. The magnet 279 is energized by a circuit extending from the conductor 195 that is connected with a positive terminal of the battery 19 (Fig. 1) through the winding of the magnet 279, conductor 281, the switch contact member 282 of the pressure operated switch device 283 to ground at 284, and to the grounded terminal 253 of the battery 19. The pressure operated switch device 283 comprises a casing containing a piston chamber 285 that is in constant communication with the passage 118 and contains a piston 286 having an upwardly extending stem 287 carrying the movable switch contact member 282. A spring 288 is provided in the upper portion of the casing for urging the piston 286 downwardly to bring the switch contact member 282 into circuit closing position.

The embodiment of the invention illustrated in Fig. 4 differs in its operating characteristic from that illustrated in Figs. 1 and 2 in that full dynamic brake application is permitted before the fluid pressure brake is applied. As the fluid pressure supplied by the self-lapping magnet valve portion 41 builds up from zero pressure to some fraction, say one-half, the full service brake cylinder pressure within the chamber 259 of the differential relay valve portion 258, and also within the piston chamber 158 of the pressure regulator device 7, the pressure regulator will make a full stroke, thus cutting in the entire resistance in the resistor 165 and effecting a full application of the dynamic brakes. The spring 273 of the differential relay valve device is so adjusted that until the pressure within the chamber 259 has risen to one-half full service brake cylinder pressure no fluid is permitted to pass the slide valve 266 to flow through the passage and pipe 263 to the brake cylinder 1, the pressure within the chamber 259 on the left hand side of the diaphragm 261 being insufficient to overcome the force of the spring 273. As the pressure within the main chamber 259 rises above this point, the force on the front of the diaphragm 261 is greater than the force of the spring 273, and moves the slide valve 266 sufficiently to uncover the end of the passage 263 permitting fluid under pressure to flow from the main chamber 259 to the brake cylinder 1 through the pipe and passage 263 and at the same time to flow to the chamber 262 on the back of the main diaphragm 261 and on the front of the diaphragm 271. The pressure within the chamber 262 acts on the back of the diaphragm 261 to aid the action of the spring 273, and on the front of the diaphragm 271 to oppose the action of the spring 273, but, since the diaphragm 261 is larger than the diaphragm 271 the total effect of the pressure within the chamber 262 is to aid the spring 273 to cause a differential action such that, as the pressure within the main chamber 259 rises above that value necessary to initially move the slide valve 266 to uncover the end of the passage 263, the pressure within the chamber 262 and within the brake cylinder 1 will increase say two pounds for every pound increase within the chamber 259, or at such other differential ratio that is determined by the ratio of the areas of the diaphragms 261 and 271. When the pressure within the chamber 262 has risen sufficiently the pressure on the back of the diaphragm 271 alone will be sufficient to overcome the force of the spring 273 so that the pressure within the chamber 262 and within the brake cylinder 1 will then correspond to the pressure within the main chamber 259.

As the pressure within the main chamber 259 builds up from one-half full service brake cylinder pressure to full service brake cylinder pressure, or is maintained by the self-lapping magnet valve portion 41 at any intermediate value, the balanced forces on the diaphragms 261 and 271 will first move the stem 264 and the slide valve 266 toward the right sufficiently to uncover the end of the passage 263 and permit fluid under pressure to flow to the brake cylinder 1 as above described, and, when the balanced forces on the diaphragms 261 and 271 have built up sufficiently to overcome the pressure on the diaphragm 261 within the chamber 259, the diaphragm stem and slide valve 266 will be moved to lap position to cut off the supply of fluid under pressure from the chamber 259 to the brake cylinder. Upon a reduction in pressure in the passage 49 and chamber 259, the valve 266 will be moved toward the left by the force of the spring 273, to its illustrated position, to release fluid under pressure from the brake cylinder 1 to the atmosphere through the exhaust port 268. It will therefore be seen that the differential relay valve device 258 operates as a relay valve with a characteristic such that, as the pressure within the chamber 259 is increased from one-half full brake cylinder pressure to full brake cylinder pressure the pressure within the brake cylinder 1 is increased from zero to full brake service pressure.

The by-pass magnet valve device 274 is for the purpose of allowing free passage of fluid under pressure from passage 49 to the brake cylinder through passage 263 independently of the differential relay valve device 258, in the case of interruption of the electric power supply. In the case of failure of the electric power supply the magnet 279 would be deenergized and the spring 278 would force the by-pass valve 277 upwardly from its seat, thus connecting the passages 49 and 263. The by-pass magnet valve device is also deenergized and operated to its upper position in case of operation of the triple valve portion 42, due to interruption of its circuit by the pressure operated switch 283 that is responsive to the pressure within the passage 118. As the pressure builds up within the passage 118, the switch 283 is operated to its circuit interrupting position, thus operating the by-pass magnet valve 277 to its upper position to permit the brake cylinder pressure to build up as rapidly as does the pressure within the passage 49.

It will be noted that, in the brake system illustrated in Fig. 4, should the brake valve device be moved less than half way from its release position to a position corresponding to full service position, the relay valve portion 258 will prevent the passage of fluid under pressure from the chamber 259 to the brake cylinder and the entire braking will be done by the dynamic brake. Should there be a failure of power in the control circuit while the dynamic brake is so operating the by-pass magnetic valve device 274 will operate to bring the brake cylinder pressure up to the pressure within the chamber 259 of the differential relay valve device, thus automatically preventing a loss in braking force.

In the system illustrated in Fig. 4 the safety valve 107 and the inshot valve passage that is closed by the ball valve 66 may be omitted, thus giving the pressure regulator 7 a wider range of control. In cases where the dynamic braking equipment is designed to produce sufficient braking capacity to effect the maximum required rate of retardation of the vehicle without the application of the pneumatic brakes, the pressure regulator 7 may operate the dynamic braking rheostat 9 directly as illustrated in Fig. 5 by the provision of a rack 289 that engages the pinion 213 for operating the rheostat arm 112, the rack being connected by the pivot 290 to a lever 291 that is mounted at its upper end on a fixed pivot pin 292, and is connected by the pivot pin 293 to the stem 162 of the pressure regulator 7. Since, however, a given position of the stem 162 corresponds to a given position of the rheostat 9 the pressure regulator 7 must be used in the manner shown in Fig. 1 to control the current limiting relays 169 and 171 where the dynamic braking equipment is not designed to produce the full braking force required since it is necessary to vary the position of the dynamic braking rheostat 9 as the vehicle slows down in order to produce the desired degree of dynamic braking. The remainder of the equipment used in the system illustrated in Fig. 5 and not here described, corresponds to that illustrated in Figs. 4 and 1.

One of the limitations to the use of the equipment thus far described is that the pressure existing within the piston chambers 158 of the pressure regulators 7 for the different braking units of a train may differ after the magnet valve portions 41 have operated to initially apply the brakes, due to different leakages at the different units. The system illustrated in Fig. 6 shows one in which the pressure supplied to the several pressure regulators 7 of the several braking units of a train will be equalized.

Referring to the embodiment of the invention illustrated in Figs. 6 and 7, the equipment employed therein comprises a brake cylinder 301 for applying the fluid pressure brakes in accordance with the operation of the control valve device 302 as limited by a differential relay valve device 303 and a by-pass magnet valve device 304, and a pressure regulator 7 for controlling the application of the dynamic brakes.

The control valve 302 and the pressure regulator 7 are controlled by variations in pressure within the straight air pipe 305 and the brake pipe 306, as controlled by the brake valve device 307 and the retardation controller device 308. A master control differential relay 309 is provided for controlling the operation of an application magnet valve device 311 and a release magnet valve device 312 in accordance with the pressure within the control pipe 313 as supplied by the brake valve device 307 and the retardation controller device 308. A pressure operated switch 314 is provided that operates the switch contact member 75 in accordance with the pressure within the dynamic brake control pipe 315 which performs the same function as the movable switch contact member 75 illustrated in Figs. 1 and 4 and operated in accordance with the movement of inshot valve device. A supply reservoir 316 is provided that is supplied with fluid under pressure through a check valve device 317 from the brake pipe 306 as supplied by a feed valve device 318 from a main reservoir 319, as controlled by the brake valve device 307.

It will be appreciated that a single brake valve device and retardation controller device is required for a single equipment, and that separate braking equipment is provided for each braking unit, comprising a master control differential relay 309, application and release magnet valve devices 311 and 312, a control valve device 302, and the parts controlled thereby.

The brake valve device 307 may correspond with that disclosed and claimed in the copending United States patent application of Ewing K. Lynn and Rankin J. Bush for Improvements in brake valve devices, Serial No. 569,158, filed October 16, 1931, and assigned to the same assignee as this application.

The brake valve device 307 comprises a casing having a main body portion 321, a self-lapping valve portion 322 and a rotary valve portion 323, the three portions together defining a pressure chamber 324 that is in open communication through the pipe and passage 325 with the piston chamber 326 of the retardation controller device 308.

The self-lapping valve portion 322 is provided with a supply valve chamber 327 to which a feed valve device 318 of the usual type supplies fluid under pressure at a reduced pressure from the main reservoir 319 through the main reservoir pipe and passage 328. A supply valve 329 is contained within the supply valve chamber 327 and is slidably disposed within a bore 331 in the casing to engage a seat 335 provided in the valve portion of the casing. The supply valve 329 is subject to the pressure of a spring 336, one end of which engages the valve, and the other end of which engages a nut 337 screw-threadedly attached within a bore in the valve portion of the casing.

The self-lapping valve portion or section of the casing 307 is also provided with a cylinder 338 which is open at one end to the pressure chamber 324, the other end of the cylinder being closed by an adjusting member 341 screw-threadedly attached within a bore in the self-lapping valve casing portion. The adjusting member 341 is provided with a central bore 342 which at its outer end is adapted to receive a screw-threaded cap member 343. Operatively mounted in the cylinder 338 adjacent its open end is a movable abutment in the form of a piston 344 having a stem 345 which is slidably guided by the adjusting member 341 within the inner end of the bore 342. At one end of the piston 344 is a chamber 346 which is constantly open to the atmosphere through the exhaust passage and port 347. A coil spring 348 is contained in the chamber 346 and is interposed between and engages the inner face of the piston 344 and the inner face of the adjusting member 341.

A release valve chamber 349 is provided within piston 344 that is in open communication with the pressure chamber 324 through a passage 351. A release valve 352 is contained within the valve chamber 349 and is adapted to seat on the valve seat 353 formed on the piston and which is operative to control communication between the valve chamber 349 and the chamber 346 through connecting passages 354 in the piston stem 345. The release valve is provided with a stem 355, the small end of which slides within a bore in the stem of the piston 344 and the larger end of which is provided with a collar 356 which slidably engages the piston within a central bore 357 and is subject to the pressure of the release valve spring 358 interposed between the engaging collar 356 and the annular flange 359 on the piston. Outward movement of the release valve relative to the piston 344 is limited by the collar 356 which engages a stop flange 361 that is secured to the piston 344.

A mechanism is provided for controlling the operation of the supply valve 329 and the release valve 352 comprising spaced levers 362 that are pivotally mounted intermediate their ends on a pin 363 supported in a plunger 364 that is slidably guided within a bore 365 in the casing of the self-lapping valve portion 322.

The lower end of the spaced levers 362 are connected together by a pin 366 which is loosely mounted within a roller 367 that is adapted to operatively engage the outer end of the release valve stem 355. The upper end of the spaced levers 362 are connected together by a pin 368 on which one end of the operating rod 369 is pivotally mounted, the opposite end of the rod operatively engaging the supply valve 329 within a recess 371 formed in its face.

For the purpose of operating the plunger 364 toward the right is provided an operating cam 372 mounted upon a shaft 373 that is carried in an upper bearing 374 and in a lower bearing 375 and is arranged to be operated by the brake valve handle 376. As the handle 376 is moved progressively from its release position toward full service application position the cam 372 forces the plunger 364 progressively toward the right.

It will be appreciated that the force of the release valve spring 358 is less than the force of the supply valve spring 336, which is less than the force of the regulating spring 348. When the cam 372 and the plunger 364 are in their release positions, as shown in Fig. 6, the spring 336 forces the supply valve 329 toward the left to its seated position, and the spring 358 forces the release valve 352 toward the left to its unseated position.

To the lower end of the shaft 373, beneath the bearing 375 a rotary valve 377 is attached within the valve chamber 378 that is in constant communication with the main reservoir 319 through the main reservoir passage and pipe 328. When the brake valve handle 376 is in other than its emergency position the rotary valve chamber 378 is also in communication, through a port 379 in the rotary valve 377, with the brake pipe passage and pipe 306. A cavity 381 is provided in the rotary valve 377 for connecting the piston chamber 384 of the retardation controller device 308 with the atmosphere through pipe and passage 382 and the exhaust port 383 when the valve 377 is in other than its emergency position.

When the rotary valve 377 and the handle 376 of the brake valve device are moved to emergency position, the brake pipe and passage 366 are connected to the exhaust port 383, through the cavity 379 in the rotary valve 377 as shown in Fig. 7 and the piston chamber 384 of the retardation controller 308 is connected to the main reservoir 319 through rotary valve chamber 378 by way of the cavity 381 in the rotary valve 377.

The retardation controller device 308 is embodied in a casing provided with a slide valve 385 that is adapted to control the flow of fluid under pressure from the pressure chamber 324 of the brake valve device 307 to the chamber 386 in the upper part of the master control differential relay device 309 through pipes 325 and 313. The slide valve 385 is provided with a cavity 387 which is adapted, in the illustrated position of the valve, to register with both the port 325 and 313 to effect communication between correspondingly numbered pipes and to cut out the flow of fluid therebetween when the valve 385 is moved toward the right an amount sufficient to lap the passage 325, and to release fluid under pressure from the chamber 386 of the master control differential relay device 309 when the valve 385 is moved toward the right sufficiently to effect communication between the passage 313 and the exhaust port 388.

The slide valve 385 is urged toward its illustrated position by the spring 390 contained within a bore in the casing and positioned between a collar 389 on the right end of the slide valve 385 and a piston 391 within a bore 392 of the casing, and is provided with a stem 393 that is connected to a piston 394 contained within the piston chamber 384 above mentioned. A rocker arm or lever 395 is pivotally mounted on the pin 396, the upper end of which is adapted to engage the piston 391 and the lower end of which is attached by a pin 397 to the stem 398 of a piston 399 contained within the above mentioned piston chamber 326. The piston 399 is normally biased toward the left by a spring 401 positioned between the end of the piston stem 398 and a cap 402 in the casing structure.

The movement of the slide valve 385 toward the right is effected by movement of the inertia body 403 toward the left. Wings or flanges 404 are provided on the inertia body 403 for supporting it upon the rollers 405. A roller 406 is provided for engaging the left hand end of the inertia body 403 and is mounted in a lever 407, pivotally mounted on the pin 408, and provided with a roller 409 in its lower end for engaging the left end of the slide valve 385. The inertia body 403 is normally held in its illustrated position at the right of the casing structure by the regulating spring 388. As the retardation of the vehicle increases the inertia tending to move the body 403 toward the left increases, thus tending to move the slide valve 385 toward the right against the bias of the spring 388. As the pressure within the pressure chamber 324 of the brake valve device 307 increases, the pressure within the piston chamber 326 of the retardation controller device correspondingly increases thus forcing the piston 399 toward the right and forcing the piston 391 toward the left to increase the force on the spring 390 thus increasing the retardation of the vehicle permitted by the retardation controller device. As the handle 376 of the brake valve device 307, and the rotary valve 377 are moved to emergency position the pressure within the piston chamber 384 correspondingly increases to the pressure within the rotary valve chamber 378, to also bias the spring 390 to increase its force and thus correspondingly increase the setting of the retardation controller device to permit a greater rate of retardation of the vehicle. A stop 411 is provided in the casing of the retardation controller device to limit the movement of the inertia body 403 toward the left. A volume reservoir 412 is provided in the pipe 313 leading to the chamber 386 of the master control differential relay device 309.

The master control differential relay device 309 comprises a casing containing the aforementioned chamber 386 in the upper portion thereof, and a chamber 413 in the lower portion, the two chambers being separated by a diaphragm 414. The diaphragm is provided with an upwardly extending stem 415 that carries a movable contact member 416 that is adapted to engage the fixed contact member 417 for controlling the operation of the application magnet valve device 311, and with a downwardly extending stem 418 for carrying the movable contact member 419 for engaging the fixed contact member 421 for controlling the operation of the release magnet valve device 312. Centering springs 422 and 423 are provided on the upper and lower sides, respectively, of the diaphragm 414, the lower spring 423 having a slightly greater force than the spring 422 so as normally to maintain the contact members 416 and 417 in engagement when no pressure exists in either of the chambers 386 and 413.

The application magnet valve device 311 comprises a casing containing a chamber 424, that is in constant open communication with the supply reservoir 316 through the supply reservoir pipe 425, and an application valve chamber 426 that is in constant communication with the straight air passage and pipe 305. The application valve 427 is provided for controlling communication between these two chambers and is biased to its unseated position by a spring 428 provided within the chamber 424, and to its lower or seated position upon energization of the magnet 429.

The release application magnet valve device 312 comprises a casing containing a chamber 431, that is in constant open communication with the straight air pipe 305, and a release valve chamber 432 that is in constant open communication with the atmosphere through the exhaust port 434, communication between which is controlled by the release valve 433 that is normally urged to its unseated position by the spring 435 within the chamber 431, and is adapted to be forced to its seated position upon energization of the magnet 436.

In the illustrated position of the diaphragm of the master control differential relay device 309, the contact members 416 and 417 are in engagement, thus completing a circuit from the positive terminal of the battery 437 through conductor 438, contact members 416 and 417, conductor 439, the winding of the magnet 429 of the application magnet valve device 311 to ground at 441, and to the grounded terminal 443 of the battery 437, thus energizing the magnet 429 and causing the application valve 427 to be forced downwardly against its seat. Upon the supply of fluid under pressure to the chamber 386 of the master control differential relay device 309 as supplied through the retardation controller device 308, the diaphragm 414 is moved downwardly, thus separating the contact members 416 and 417 and causing engagement of the contact members 419 and 421 to complete a circuit from the positive terminal of the battery 437 through conductor 438, the contact members 419 and 421, conductor 443, the winding of the magnet 436 of the release magnet valve device 312 to ground at 441 and to the grounded terminal 442 of the battery 437, thus energizing the magnet of the release magnet valve device and causing the release valve 433 to be moved downwardly against its seat to close communication from the straight air pipe 305 to the atmosphere through the exhaust port 434. When the diaphragm 414 of the relay 309 moves downwardly as the pressure within the upper chamber 386 builds up, fluid under pressure is, therefore, supplied from the supply reservoir 316 through the application magnet valve device 311 to the straight air pipe 305 until the pressure in the lower chamber 413 of the master control differential relay device 309, which corresponds to straight air pipe pressure, builds up to such a value as to cause separation of the contact members 419 and 421.

The control device 302 comprises a casing having a piston chamber 444 that is in constant communication with the brake pipe 306 through passage 306, and contains a piston 445 that is provided with a stem 446 extending into the slide valve chamber 447 containing a slide valve 448 and a graduating valve 449 that are actuated by the stem 446. A cavity 451 is provided in the main slide valve 448 for connecting the pipe and passage 452 to the exhaust port 453 when the piston and slide valve 448 are in release position. A port 454 is provided in the main slide valve 448 that is effective, when the piston and its stem 446 is moved upwardly, to register with the passage 452 and effect communication from the auxiliary reservoir 455 to the pipe and passage 452 through the slide valve chamber 447. A graduating stem 456 is provided above the piston 445 and is engaged by the piston when moved to its service application position. The stem 456 is urged downwardly by a spring 457 which is compressed upon a sufficient upward movement of the pistons 445, which is effected when the piston and slide valves are moved to their emergency application position.

The control valve device 302 is also provided with a piston chamber 458 containing a double check valve or piston 459, the piston chamber 458 being in constant open communication with the straight air passage and pipe 305 and in communication with the passage and pipe 461 when the slide valve piston 459 is in its extreme right, or illustrated, position, thus effecting communication between the straight air pipe 305 and the pipe 461 leading to the differential relay valve device 303, and from there to the brake cylinder 301. A chamber 462 is provided on the right side of the piston 459 that is in constant communication with the passage and pipe 452, and, when the piston 459 is urged to its extreme left position is also in communication with the passage and pipe 452.

The pressure operated switch 314 comprises a casing containing a piston chamber 463, containing a piston 464 having a stem 465 for carrying the movable switch contact member 75. A spring 466 is provided within the casing extending from the lower wall thereof against the under side of the piston 464 for biasing the piston and the movable switch contact member upwardly to their illustrated positions, and adapted to permit the piston and movable contact member to be forced downwardly into engagement with the switch contact members 83 and 84 when the pressure within the piston chamber 463, and in the dynamic brake controlling pipe 315 increases above a predetermined value by the supply of fluid under pressure thereto, either from the straight air pipe 305 through the double check valve device 467, or from the auxiliary reservoir 455 as controlled by the control valve device 302 through pipe 452 and the double check valve 467.

A pressure operated switch device 475 is provided for interrupting the circuit through the winding of the by-pass magnet valve device upon a predetermined pressure within the pipe 452, and comprises a casing enclosing a piston chamber 477 in constant open communication with the pipe 452 and containing a piston 478 provided with a stem 479 that is operatively connected to a movable switch contact member 476. A spring 480 is provided within the casing for urging the piston 478 and the switch member 476 to their lower, or illustrated positions.

The operation of the braking system will now be described. The various parts of the apparatus are illustrated in their brake release position, and in this position the equipment is charged by the flow of fluid under pressure from the main reservoir 319, past the feed valve 318 to the pipe 328 to charge the rotary valve chamber 373 in the lower portion of the casing of the brake valve device 307 and through port 379 to the brake pipe 306. From the brake pipe 306 fluid under pressure flows past the check valve device 317 to charge the supply reservoir 316 and the chamber 424 in the lower portion of the casing of the application magnet valve device 311, the check valve device 317 preventing the flow of fluid under pressure from the supply reservoir 316 to the brake pipe upon a reduction in brake pipe pressure. Fluid under pressure also passes from the brake pipe 306 to the piston chamber 444 of the control valve device 302 forcing the piston 445 and the slide valve 448 to their release positions, thus charging the auxiliary reservoir 455 through feed groove 440 and slide valve chamber 447.

If the operator wishes to make a service application of the brakes the handle 376 of the brake valve device 307 is moved from its release position an amount dependent upon the degree of application of the brakes desired. Upon the initial movement of the handle from its release position the sloping surface of the cam 372 moves against the plunger 364 forcing the plunger toward the right. The first part of this movement effects a compression of the release valve spring 358 and forces the release valve 352 to its seat, closing communication between the pressure chamber 324 and the atmosphere through passages 351, 354 and the exhaust port 347. Further movement of the plunger 364 toward the right causes the spaced levers 362 to pivot about their lower ends, further movement of the roller 367 being prevented by the stiffness of the regulating spring 348, thus causing the rod 369 to force the supply valve 329 against the compression of the supply valve spring 336 to open communication between the main reservoir pipe and passage 328 and the pressure chamber 324 through the supply valve chamber 327, thus supplying fluid under pressure from the main reservoir 319 through the retardation controller device 308 to the upper chamber 386 of the master control differential relay device 309 and to the piston chamber 326 of the retardation controller device 308. The pressure established in the pressure chamber 324 of the brake valve device 307, in the piston chamber 326, and in chamber 386, is dependent upon the degree of movement of the operating lever 376 and of the plunger 364 from their release positions since, when the pressure within the chamber 324 increases due to the flow of fluid thereto through the supply valve chamber 327, a like pressure is exerted on the chamber side of the piston 344 in opposition to the pressure exerted by the regulating spring 348. This pressure continues to build up until it becomes sufficient to force the piston 344 toward the right, thus relieving the pressure on the roller 367 and permitting the supply valve spring 336 to force the rod 369 toward the left, pivoting the lever 362 about the pivot 363 and moving the supply valve 329 into engagement with its seat 335. The amount of pressure on the chamber side of the piston 344 necessary to effect sufficient movement of the piston 344 to cause the supply valve 329 to seat is dependent upon the amount of movement of the operating lever 376 and of the plunger 364 from their release positions. The greater the movement of the operating lever 376 from its release position the greater will be the amount of movement of the pivot pin 363 toward the right and, consequently, the greater will be the compression of the regulating spring 348 necessary to permit movement of the lever 362 and of the rod 369 to effect the seating of the supply valve 329. It will be apparent, therefore, that the brake valve device is self-lapping on a pressure basis the degree of fluid pressure within the pressure chamber 324 necessary to effect the movement of the valve to lap position being dependent upon the degree of movement of the operating lever 376 from its release position.

Fluid under pressure thus supplied to the piston chamber 326 of the retardation controller device effects movement of the piston 399 toward the right and the movement of the lever 395 in a counterclockwise direction, thus forcing the piston 391 toward the left against the compression of the spring 390, which compression determines the setting of the retardation controller 308 by establishing the force necessary on the front end of the slide valve 385 that must be exerted by the inertia body 403 to move the slide valve to lap position.

Fluid under pressure thus supplied to the retardation controller device and, through pipe 318 and volume reservoir 412, to the chamber 386 exerts a pressure on the upper side of the diaphragm 410 forcing the diaphragm downwardly and causing separation of the contact members 416 and 417 and engagement of the contact members 419 and 421.

Engagement of the contact members 419 and 421 completes a circuit from the positive terminal of the battery 437 through conductor 438, the contact members 419, 421, conductor 443, the winding of the magnet 436 of the release magnet valve device 311, to ground at 441 and to the grounded terminal 442 of the battery 437, thus energizing the magnet of the release magnet valve device 312 and forcing the release valve 433 to be moved downwardly to its seat to close communication from the straight air pipe 305 to the atmosphere through the exhaust port 434.

At the same time the separation of the contact members 416 and 417 interrupt the circuit through the winding of the magnet 429 of the application magnet valve device 311, thus permitting the spring 428 in the lower part of the casing to move the application valve 427 upwardly to effect communication from the supply reservoir 316 through pipe 425, chamber 424, the application valve chamber 426 to the straight air pipe 305. It will be noted that the application magnet valve devices 311 and the release magnet valve devices 312 on each of the braking units of the train will be simultaneously operated in the manner above described to increase the pressure within the straight air pipe 305 which extends throughout the length of the train.

As the pressure in the straight air pipe 305 builds up, the pressure in the lower chamber 413, that is in constant communication with the straight air pipe, correspondingly builds up until the pressure beneath the diaphragm 414 is substantially equal to that within the chamber 386 above the diaphragm, or until the diaphragm 414 is moved upwardly sufficiently to separate the contact members 419 and 421 to maintain the application valve 427 and the release valve 433 in their lap positions, thus maintaining the pressure within the straight air pipe 305 in correspondence with that within the pressure chamber 324 of the brake valve device 307.

As the pressure builds up within the straight air pipe 305 fluid under pressure flows from the straight air pipe to the chamber 458 at the left of the piston 459 of the double check valve devices in the control valve device 302, and by passage and pipe 461 to the main chamber 259 of the differential relay valve device 303 to operate the differential relay valve device in the manner above described with respect to Fig. 4 to supply fluid under pressure to the brake cylinder 301 when the pressure in the main chamber 259 has risen sufficiently to overcome the force of the spring 253 and move the graduating stem 273 toward the right from its illustrated position. As above stated, with respect to Fig. 4 the ratio of the areas of the diaphragms 261 and 271 of the differential relay valve device may be such that the pressure required in the main chamber 259, before the initial supply of fluid to the brake cylinder 301 is effected, may be one-half of the full service brake cylinder pressure.

While fluid under pressure is being thus supplied to the main chamber 259 of the differential relay valve device, fluid under pressure is also supplied from the straight air pipe 305 to the under side of the piston 468 of the double check valve device 467, and therethrough to the dynamic brake controlling pipe 315, to the piston chamber 158 of the pressure regulator 7, and to the piston chamber 463 of the pressure operated switch device 314. As the pressure in the piston chamber 463 builds up to the initial value required to move the switch contact member 75 out of engagement with the contact members 81 and 82 and into engagement with the contact members 83 and 84, the circuit through the operating windings of the line contactor 159, and the power controlling relays 192 and 193 shown in Fig. 1 is interrupted and the circuit through the dynamic braking relays 202 and 205 is completed in the manner above described. As the pressure within the main chamber 259 of the differential relay valve device in building up from zero pressure to one-half full brake cylinder pressure, the corresponding build-up of pressure within the piston chamber 158 of the pressure regulator 7 causes the stem 162 and the rheostat arm 163 to be moved through a full stroke, corresponding to a full application of the dynamic brake, so that, if the dynamic brake is sufficient to cause the entire amount of braking of the vehicle required by the pressure developed within the pressure chamber 324, and within the straight air pipe 305, fluid under pressure will not pass through the differential relay valve device 303 to the brake cylinder 301. Should, however the braking required by the pressure within the straight air pipe 305 be greater than that which can be supplied by full application of the dynamic brake, the pressure within the main chamber 259 of the differential relay valve device will build up sufficiently by the supply of fluid under pressure from the straight air pipe 305 through the chamber 458 of the double check valve device, pipe 461 and chamber 259, to move the stem 264 and the slide valve 266 toward the right to effect communication from chamber 259 to the brake cylinder 301, until the braking called for by the pressure within the straight air pipe 305 is brought into effect. If, for any reason, the power supplying the control circuit for operating the application magnet valve device 311, and the release magnet valve device 312, fails, the circuit from the source of supply through the windings of the magnet 469 of the by-pass magnet valve device 304 to ground at 471 is interrupted, thus causing the by-pass magnet valve 277 to be forced upwardly by the spring 278, and thus permitting fluid to pass from the pipe 461 to the brake cylinder pipe 472 and to the brake cylinder 301, independently of the operation of the differential relay valve device 303.

If, after the brakes have been applied, the rate of retardation of the vehicle becomes sufficient to cause the inertia body 403 of the retardation controller device 308 to be moved forward against the roller 406 carried by the lever 407, thus moving the roller 409 at the lower end of the lever toward the right and moving the slide valve 385 against the bias of the spring 390, the slide valve 385 will lap the end of the passage 325, thus interrupting the communication between the pressure chamber 324 of the brake valve device 307 and the upper chamber 386 of the master control relay valve device 309. The pressure within the chamber 386 and, consequently, within the straight air pipe 305 will thus be prevented from building up to the pressure within the pressure chamber 324 of the brake valve device 307, thus maintaining a lesser degree of application of the brakes than that corresponding to the pressure within the chamber 324. If the rate of retardation of the vehicle becomes sufficient to cause the inertia body 403 to move still further toward the left, thus moving the roller 409 and the slide valve 385 further toward the right, or until the cavity 387 therein is positioned to connect the passage 313 and with the exhaust port 388, the pressure within the chamber 386 will be reduced thus decreasing the pressure within the straight air pipe by operation of the master control differential relay device 309 to effect a corresponding operation of the release magnet valve device 312 upon engagement of the contact members 416 and 417 to correspondingly decrease the degree of application of the brakes. The tension on the spring 390 of the retardation controller device 308 may be changed at any time by movement of the brake controlling handle 376 to change the pressure within the pressure chamber 324 of the brake valve device 307 which is in constant communication with the piston chamber 326 of the retardation controller device, and is effective to change the compression of the spring 390 to require a different force to be exerted thereon by the inertia body 403 in order to operate the slide valve 385 to lap position. For example, if the slide valve 385 is in lap position, and the pressure within the pressure chamber 324 and within the piston chamber 326 is increased, the increased force on the spring 388 may be sufficient to move the slide valve 385 to its illustrated position against the then existing force on the inertia body 403, to effect a further supply of fluid under pressure through pipes 325 and 313 to the upper chamber 386 of the master control differential relay device 309, to cause operation thereof to correspondingly increase the pressure within the straight air pipe 305 and a corresponding increase in the degree of application of the brakes. Similarly, a decrease in the pressure within the pressure chamber 324, and within the piston chamber 326 of the retardation controller device 308, will effect a decrease in the pressure against the spring 390 to permit the slide valve 385 to be moved to its release position as the result of a lesser force exerted thereon by the inertia body 403 to effect a decrease in the pressure within the straight air pipe 305 and a corresponding decrease in the degree of application of the brakes.

If the operator wishes to release the brakes, the handle 376 is moved to release position, thus moving the cam 372 out of engagement with the plunger 364 and permitting the release valve spring 358 acting against the release valve stem 355 to force the roller 367 and the spaced levers 362 toward the left to unseat the release valve 352, and permit the flow of fluid under pressure from the pressure chamber 324 to the atmosphere through passages 351, 354 and the exhaust port 347, and consequently from the piston chamber 326 of the retardation controlled device 308.

The reduction in pressure within the piston chamber 326 of the retardation control device may effect a sufficient decrease in pressure upon the spring 390 to permit the slide valve 385 to be moved to its release position, thus effecting the release of fluid under pressure from the pressure chamber 386 of the master control differential relay 309 through exhaust port 388, until the rate of retardation of the vehicle has decreased sufficiently to permit the movement of the inertia body 403 toward the right, to its illustrated position, by the pressure of the spring 390 acting upon the right end of the slide valve 385, whereupon further decrease in pressure will be occasioned by the flow of fluid under pressure through the pipe 313, the cavity 387 of the valve 385 through pipe 325 to the pressure chamber 324 and through exhaust port 347 to the atmosphere.

Upon such release of fluid under pressure from the chamber 386, the diaphragm 414 moves upwardly to its illustrated position, causing engagement of the contact members 416 and 417, and the completion of the circuit through the winding of the magnet 429 of the application magnet valve device 311, to move the application valve 427 to its seat, and causes the interruption of the circuit through the contact members 419 and 421 that energizes the winding of the magnet 436 of the release magnet valve device 312, thus permitting the release valve 433 to be moved upwardly to its illustrated position by the spring 435 to effect the release of fluid under pressure from the straight air pipe 305 to the atmosphere through the exhaust port 434, thus correspondingly releasing the pressure within the piston chamber 158 of the pressure regulator 7, and within the piston chamber 463 of the dynamic brake controlling pressure operated switch 314. A reduction in straight air pipe pressure also effects corresponding reduction in the pressure within the main chamber 259 of the differential relay valve device 303 thus permitting the stem 264 and the slide valve 266 to be moved by the spring 273 to release position to effect the release of fluid under pressure from the brake cylinder 301 to the atmosphere through cavity 267 and the exhaust port 268 of the differential relay valve device 303.

If the operator wishes to make an emergency application of the brakes the handle 376 of the brake valve device 307 is moved to the extreme position away from its release position, thus operating the cam 372 to effect an operation of the self-lapping valve portion of the brake valve device to produce a maximum pressure within the pressure chamber 324, with a corresponding increase in pressure within the piston chamber 326 of the retardation controller device 308, and also in the upper chamber 386 of the master control differential relay device 309 to effect an operation of the application magnet valve device 311 and of the release magnet valve device 312 to produce a maximum pressure within the straight air pipe 305 in the manner above described for service application of the brakes. Fluid under pressure will thus flow from the straight air pipe 305 through the chamber 458 of the double check valve forcing the piston 459 toward the right, and supplying fluid under pressure through the pipe 461 to the main chamber 259 of the differential relay valve device 303 to effect a sufficient pressure on the diaphragm 261 to force the diaphragm and the stem 264 toward the right, thus moving the slide valve 266 to effect a supply of fluid under pressure from the main chamber 259 to the brake cylinder 301 through the brake cylinder pipe 472. When the handle 376 is moved to its extreme or emergency position the movement of the rotary valve 377 at the lower end of the shaft 373 interrupts communication between the brake pipe 306 and the rotary valve chamber 378 through the valve port 379 and effects communication between the brake pipe 306 and atmosphere through the exhaust port 383 as shown in Fig. 7, thus releasing fluid under pressure from the brake pipe and reducing brake pipe pressure, while at the same time interrupting communication, shown in Fig. 6, between the pipe 382 and atmosphere through the exhaust port 383, and effecting communication through pipe 382 and port 381 between the retardation controller piston chamber 384 and the rotary valve chamber 378, that is constantly in communication with the main reservoir pipe 328, to effect the supply of fluid under pressure to the piston chamber 384 at main reservoir pipe pressure, thus forcing the piston 394 toward the left against the bias of the spring 390 and adding a correspondingly increased compression to the spring to effect a greater force against the left end of the slide valve 385, to correspondingly increase the setting of the retardation controller device 308 so that a greater force of inertia of the inertia body 403 toward the left is required to move the slide valve 385 to lap position, thus insuring a greater rate of retardation of the vehicle before the increase in pressure within the straight air pipe 305 is limited by operation of the retardation controller device.

The reduction in pressure in the brake pipe 306 effects a corresponding reduction in the piston chamber 444 of each of the control valve devices 302 associated with each braking unit, thus causing the piston 445 to be moved upwardly. If reduction in brake pipe pressure is sufficient only to effect pneumatic service application of the brakes, the piston 445 will move into engagement with the graduating stem 456 that is held in position by the spring 457, the stem 446 extending downwardly from the piston 445 will first move the graduating slide valve 449 upwardly to uncover the inner end of the port 454 in the main slide valve 448, and will then move upward sufficiently to bring the port 454 into registration with the inner end of the passage 452 to effect communication from the auxiliary reservoir 455 through passage and pipe 452 to the chamber 462 of the double check valve comprising the piston 459, and to the upper side of the double check valve having piston 468.

The normal operation of the system is such that the straight air pipe pressure builds up more rapidly on the lower side of the piston 468 than does the pressure supplied from the auxiliary reservoir 455 to the upper side of the piston 468, so that fluid under pressure is normally supplied from the straight air pipe 305 through the double check valve device 467 to the dynamic brake control pipe 315, and the pressure in the chamber 462, which corresponds to the pressure in the pipe 452, is less than the pressure within the piston chamber 458, which corresponds to straight air pipe pressure, so that the differential pressures on the opposite sides of the piston 459 maintain the piston in its illustrated position and permits fluid under pressure to flow from the straight air pipe 305 through chamber 458 to pipe 461. As pressure builds up in the pipe 452 the piston 478 and the contact member 476 of the pressure operated switch 475 are moved upwardly against the force of the spring 480, thus interrupting the circuit through the winding of the magnet 469 and permitting the by-pass valve 277 to be moved upwardly from its seat by the spring 278 to establish communication from pipe 461 to the brake cylinder 301 through pipe 472.

If, for any reason, pressure fails to build up in the straight air pipe 305, the pressure on the upper side of the piston 468 will force it to its lower position and effect the supply of fluid under pressure to the dynamic brake control pipe 315 communicating with the piston chamber 158 of the pressure regulator device 7 and with the piston chamber 463 of the pressure operated switch 314. The supply of fluid under pressure to the piston chamber 463 of the pressure operated switch device 314 will cause the piston 464 and the movable switch member 75 of the switch device 314 to be moved downwardly into engagement with the switch contact members 83 and 84 to effect the application of the dynamic brake in the manner above described and the supply of fluid under pressure to the piston chamber 158 of the pressure regulator 7 will effect movement of the stem 162 and of the rheostat arm 163 toward the right to cause a maximum degree of application of the dynamic brakes.

If the brake pipe pressure is reduced at an emergency rate, the piston 445 moves upwardly against the graduating stem 456 with sufficient force to compress the spring 457 sufficiently to move the end of the main slide valve 448 to uncover the end of the passage 452, to permit the supply of fluid under pressure thereto from the slide valve chamber 447, past the lower end of the slide valve 448 and effect a more rapid rate of increase in pressure within the check valve chamber 462 and within the chamber on the upper side of the double check valve piston 468.

Should the pressure in the straight air pipe 305 fail for any reason while the piston 445 and the slide valve 448 are in service application position, or in emergency application position, the pressure in the chamber 458 to the left of the check valve piston 459 will be reduced below the pressure in the chamber 462 thus moving the piston 459 toward the left to effect communication between the chamber 462 and the main chamber 259 of the differential relay valve device, through passage and pipe 461 to effect the supply of fluid under pressure from the auxiliary reservoir 455 to the brake cylinder 301 through the by-pass magnet valve device. Upon a reduction in straight air pipe pressure, the pressure below the piston 468 of the double check valve device 467 will be correspondingly reduced permitting the pressure above the piston 468 to move the piston downwardly and effect the supply of fluid under pressure from the auxiliary reservoir 455 to the piston chamber 158 of the pressure regulator 7 and to the piston chamber 463 of the pressure operated switch 314 to effect the application of the dynamic brakes in the manner above described.

Referring to the braking equipment illustrated in Fig. 8, a brake valve device 481 is provided for controlling the setting of a retardation controller device 482 which acts in the capacity of a self-lapping brake valve device to control the operation of the application magnet valve device 483 and of a release magnet valve device 484 which controls the supply of fluid under pressure to and the release of fluid under pressure from a pressure operated rheostat 485, the supply of fluid under pressure being from the main reservoir pipe 486 as supplied through the feed valve device 487 from the main reservoir 488. The pressure operated rheostat 485 controls the degree of energization of each of the self-lapping magnet valve devices 489, one of which is associated with each braking unit of the train, the apparatus illustrated comprising one such braking unit only, the operation of each such self-lapping magnet valve device being effective to control the supply of fluid under pressure from its associated supply reservoir 490 to its associated pressure regulator 7 to control the dynamic brake equipment, and to the brake cylinder 301 to control the fluid pressure braking equipment through the control valve device 302 and the differential relay valve device 303, in the same manner that fluid under pressure from the straight air pipe 305 of the system shown in Fig. 6 is controlled through these control valve devices and differential relay valve devices to the pressure regulators and brake cylinders of the several braking units.

A triple valve device 492 is provided, having an associated auxiliary reservoir 493, for controlling the supply of fluid under pressure to the piston chamber 494 of the retardation controller device 482 to increase the setting of the retardation controller device upon a reduction in brake pipe pressure.

The brake valve device 481 comprises an operating lever 495 for rotating the shaft 496, upon the lower end of which may be provided a rotary valve for effecting the release of fluid under pressure from the brake pipe 309 in the usual manner as illustrated in the brake valve shown in Fig. 6, and which is provided with a connecting link 497 for varying the setting of the retardation controller device 482 in accordance with the position of the brake valve operating handle 495.

The retardation controller device 482 comprises a casing 498 containing an inertia or pendulum device 499 pivotally mounted upon the pin 505 and carrying a contact member 501 that is adapted to engage a fixed contact member 502 which may be moved by the pendulum to engage the fixed contact member 503. The contact members 502 and 503 are carried by a movable support 504 that is also pivotally mounted upon the pin 505 and is connected, at its upper end, by the pin 506 to the connecting link 497. A spring 507 is provided, one end of which is connected to the casing 498 and the other end of which is connected to the lower end of the movable support 504 for normally urging the movable support in a counterclockwise direction against the force of the connecting link 497. An adjustable stop member 508 is provided in the casing 498 to limit the movement of the pendulum 499 toward the right. Above the stop member the casing portion is formed to enclose the above mentioned piston chamber 494 containing a piston 509 provided with a stem 511 that extends through a bore in the casing wall to engage the pendulum 499 to urge it toward the left when pressure is exerted within the piston chamber 494. A spring 512 is provided surrounding the stem 511, one end of which engages the inner wall of the casing structure and the other end of which engages the back of the piston 509, to force piston 509 and the stem 511 away from the pendulum 499.

The application magnet valve device 483 comprises a casing containing a chamber 513, that is in constant communication with the main reservoir pipe 486, and an application valve chamber 514, that is in constant communication, through the passage and pipe 515, with the piston chamber 516 of the pressure operative rheostat device 485. Communication between the main reservoir pipe 486 and the piston chamber 516 through chambers 513 and 514 is controlled by the application valve 517 that is normally urged upwardly from its seat by a spring 518, within the chamber 513, and is urged downwardly to its seated position upon energization of the magnet 519 in the upper portion of the casing.

The release magnet valve device 484 comprises a casing containing a lower chamber 521, that is in constant communication through passage and pipe 515 with the piston chamber 516 of the pressure operated rheostat device 485, and an upper chamber 522 that is in constant communication with the atmosphere through the exhaust port 523. A release valve 524 is provided within the release valve chamber 521 for controlling communication between the pressure operated rheostat piston chamber and the atmosphere, and is urged to its seated position by a spring 525 within the release valve chamber 521, and adapted to be forced downwardly from its seat upon energization of the magnet 526 in the upper part of the casing.

The pressure operated rheostat device 485 comprises a casing providing the aforementioned piston chamber 516 containing a piston 527 having a downwardly extending stem 528, the end of which engages a core member 529 that is associated with the coil 531. The lower end of the core member engages a lever 532, that is pivotally supported on a pin 533 carried by a bracket 534 extending from the casing structure, the outer end of which carries a contact member 535 that is adapted to engage any one of the several contact members 536 associated with the rheostat resistor 537. A spring 538 is provided, the lower end of which is attached to the lever 532 and the upper end of which is attached to a bracket extending from the casing structure, of the pressure operated rheostat, to pull the lever 532 upwardly to move the contact member 535 out of engagement with the contact members 536 when pressure is reduced in the piston chamber 516.

The self-lapping magnet valve device 489 comprises a casing structure containing a magnet 539, having an operating winding and a core member 541, the lower end of which engages a piston or sliding member 542 to which is internally screw-threaded a nipple 543 that is adapted to engage a sleeve 544 which is screw-threadedly attached to a stem 545 between which sleeve and stem a diaphragm 546 is attached dividing the space within the casing structure into an outlet chamber 547, that is in constant communication with the atmosphere through the exhaust port 548, and a diaphragm chamber 549, that is in constant communication with the piston chamber 458 of the double check valve portion of the control valve device 302 through pipe 551. The stem 545 is provided with a valve seat 552 for a release valve 553 positioned within the diaphragm chamber 549 for controlling communication between the chamber 549 and the outlet chamber 547. A spring 554 is provided within the diaphragm chamber 549 for urging the stem 545 and the core 541 upwardly to unseat the valve 553 and effect communication between the pipe 551 and the atmosphere. A valve 555 is provided in axial alignment with the valve 553, having a seat in a partition wall 556 of the casing, and is provided with an upwardly extending stem 557 which extends through a bore in said wall and engages the valve 553. The valve 555 controls communication between the fluid pressure supply valve chamber 558, that is connected to the supply reservoir 490 by pipe 559, and the diaphragm chamber 549 at the under side of the diaphragm 546, that is connected to the control valve device through pipe 551. A spring 561 is provided within the chamber 558 for urging the valve 555 to its seat, and a stop 562 is provided in the lower part of the casing structure to limit the downward movement of the valve 555.

The control valve device 302, differential relay valve device 303 and brake cylinder 301 are constructed and connected in the same manner as disclosed and described in Fig. 6. The pressure regulator 7 for controlling the dynamic brakes is similar in construction to that shown in Fig. 6, but is connected to be responsive to the pressure within the pipe 461, extending from the double check valve portion of the control valve device 302 to the main chamber 259 of the differential relay valve device 303, and the movable switch member 75 for operating the power controlling and dynamic brake relays is operated directly by the stem 162 of the piston 159 of the pressure regulator instead of being operated by a separate pressure operated switch as disclosed in Fig. 6.

The triple valve device 492 comprises a casing provided with a piston chamber 563 containing a piston 564 having a steam 565 for engaging a slide valve 566 having a cavity 567 that is adapted to connect the piston chamber 494 of the retardation controller device through pipes 568 with the atmosphere through the exhaust port 569, when the slide valve and piston are in their extreme right or illustrated positions. A spring 571 is provided within the piston chamber 563, one end of which engages the end of the casing, and the other end of which engages the face of the piston 564 for forcing the piston toward the right, to its illustrated position.

The foot valve device 491 comprises a casing provided with an outlet chamber 574 that is in constant communication with the atmosphere through an exhaust port 575, a chamber 576, that is in constant communication with the brake pipe 306, and a valve chamber 577 that is in constant communication with the main reservoir pipe 486, the chambers 576 and 577 being separated by a wall 578 in the casing structure. The valve chamber 577 contains a valve 579 that is adapted to engage the seat 581 in the wall 578 of the casing structure, and is forced toward its seat by a spring 582 in the valve chamber 577. The valve 579 is provided with a stem 583 extending through a bore in said wall 578 and engaging a diaphragm 584 that is adapted to be urged against a rib seat 585 to close communication between the chamber 576 and the outlet chamber 574. A foot lever 586 is mounted on the pivot pin 587 and is adapted to urge the plunger 588 against the diaphragm 584 to force the diaphragm to its rib seat 585. A spring 589 is provided for urging the lever 586 upwardly when pressure thereon is released, thus permitting the diaphragm 584 to be forced from its rib seat by the valve stem 583 in response to the force exerted by the spring 582 in a direction to force the valve 579 to its seat to close communication between the main reservoir pipe 586 and the brake pipe 306 through valve chamber 577 and the chamber 576.

The various parts of the apparatus are illustrated in Fig. 8 in their release positions. The system is charged by the flow of fluid under pressure from the main reservoir 448 at a reduced pressure as supplied by the feed valve device 487 through a main reservoir pipe 486 and to the chamber 513 of the application magnet valve device 488. Upon the application of pressure to the foot valve lever 586 the diaphragm 584 is forced to its seat 585 to close communication from the brake pipe 306 to the atmosphere, and the valve 579 is forced from its seat, to its illustrated position, thus permitting the supply of fluid under pressure from the main reservoir pipe through chambers 577 and 576 to charge the brake pipe 306. Fluid under pressure flows from the brake pipe 306 to the piston chamber 563 of the triple valve device 492 and through the feed groove 572 in the wall of the piston chamber to the slide valve chamber 573, and to the auxiliary reservoir 493. Fluid under pressure also flows from the brake pipe 306 to the piston chamber 444 of the control valve device 302, through the feed groove 440 in the wall of the piston chamber to the slide valve chamber 447 and to the auxiliary reservoir 455 charging the auxiliary reservoir to brake pipe pressure.

Fluid under pressure also flows from the brake pipe 306 through the check valve 591 to charge the supply reservoir 490 and through the pipes 559 to charge the inlet valve chamber 558 of the self-lapping magnet valve device 489.

With the operating lever 495 of the brake valve device 481 in its illustrated or release position a circuit is closed from the positive terminal of the battery 592, through conductor 593, the movable contact member 501 on the retardation controller device 482, the contact members 502 and 503, conductor 594, the winding of the magnet 526 of the release magnet valve device 484, to ground at 595, and to the grounded terminal 596 of the battery 592, thus energizing the magnet of the release magnet valve device and forcing the release valve 524 downwardly against the force of the spring 525 to effect communication between the piston chamber 516 of the pressure operated rheostat device 485 through the exhaust port 523 of the release magnet valve device. A circuit is also completed from the positive terminal of the battery 592 through conductor 593, the movable contact member 501 of the retardation controller device, the contact member 502, conductor 597, the winding of the magnet 519 of the application magnet valve device 483, to ground at 595, and to the grounded terminal 596 of the battery 592, to energize the magnet 519 and force the application valve 517 downward to its seat against the bias of the spring 518, to close communication between the main reservoir pipe 486 and the piston chamber 516 of the pressure operated rheostat.

If the operator wishes to apply the brakes the handle 495 of the brake valve device 481 is moved toward the right from its illustrated or release position an amount dependent upon the desired degree of application of the brakes. Upon such movement of the handle 495, the link 497 and the pin 506 are effective to move the movable support 504, carrying the contact members 502 and 503, about the pivot pin 505 in a clockwise direction to bring the contact members 503 and 502 out of operative engagement with the contact member 501, and due to the spring construction of the contact members 502 and 503 to also cause them to separate from engagement with each other, thus interrupting the circuits above traced through the winding of the magnet 519 of the application magnet valve device 483 and the winding of the magnet 526 of the release application valve device 484, and deenergizing both of the magnets, thus permitting the application valve 517 to be forced upwardly from its seat by the spring 518, and the release valve 524 to be forced upwardly to its seat by the spring 525, the valve 517 thus effecting communication between the main reservoir pipe 486 and the piston chamber 516 of the pressure operated rheostat device 485, and the release valve 524, thus closing communication from the piston chamber 516 to the atmosphere through the exhaust port 523.

Upon the supply of fluid under pressure to the piston chamber 516 of the pressure operated rheostat 485 the piston 527 and piston stem 528 are moved downwardly forcing the core 529 and the lever 532 downwardly, the lever pivoting about the pin 533 and causing engagement of the contact member 535 with one of the contact members 536 connected to successive points of the resistor 537. Upon engagement of the contact member 535, carried by the lever 532, with one of the contact members 536 a circuit is completed from the battery 592 through conductor 598, contact member 535 and a portion of the resistor 537 to the train line conductor 599, thus bringing the train line conductor to a voltage above ground dependent upon the amount of the resistor 537 that is connected in circuit therewith. This circuit is completed from the train line conductor 599 through the winding 531 of the pressure operated rheostat device 485 to ground at 601, thus energizing the core 529 to force it upwardly against the piston stem 528. The lever 532 and the contact member 535 will thus be brought to rest at a balanced position when the upward force of the magnet comprising the winding 531 and the core 529 is equal to the downward pressure on the upper side of the piston 527. The greater the downward force on the piston, the greater will be the necessary downward movement of the contact member 535 to effect the energization of the winding 531 necessary to produce an equal and opposite force. It will therefore be seen that the voltage across the winding 531 when the lever 532 is in balanced position will be proportional to the pressure in the piston chamber 516. The voltage between the train line conductor 599 and ground is also impressed across each of the magnet windings of each of the self-lapping magnet valve devices 489, the circuit extending from the train line conductor 599 through the winding of the magnet 539 to ground at 602 and to the grounded terminal 596 of the battery 592.

Upon the energization of the winding of the magnet 539 of the self-lapping magnet valve device 489 the core 541 is energized and forced downwardly causing the nipple 543 to engage the sleeve 544 and force the stem 545 downwardly to cause engagement between the release valve seat 552 and the release valve 553 to close communication between the pipe 551 and the outlet chamber 547, and upon a continuing downward movement of the stem 545 to force the release valve 553 downwardly against the inlet valve stem 557, thus forcing the inlet valve 555 downwardly from its seat against the pressure of the spring 561, thus effecting communication from the supply reservoir 490, through the diaphragm chamber 549 and pipe 551 to the piston chamber 458 of the check valve portion of the control valve device 302, through pipe 461 to the main chamber 259 of the differential relay valve device 303, and to the piston chamber 158 of the pressure regulator 7, thus effecting application of the dynamic brakes through operation of the pressure regulater 7, and application of the fluid pressure brakes through operation of the differential relay valve device 303 in the same manner as above described for the equipment illustrated in Fig. 6.

Upon the application of the brakes as just described the pendulum 499 of the retardation controller device 482 will swing forwardly, or toward the left as illustrated in the figure, to assume an angle with respect to the vertical position corresponding to the rate of retardation of the vehicle. As the rate of retardation of the vehicle increases and the angularity of the pendulum 499 correspondingly increases with respect to the vertical position, and the contact member 501 carried by the pendulum 499 will eventually engage the contact member 502 carried by the movable support 504 at some predetermined rate of retardation of the vehicle, dependent upon the amount of movement of the brake valve handle 495, and, consequently, of the movable support 504 from their release positions. Upon such engagement the contact member 501 with the contact member 502 a circuit will be completed through the winding of the magnet 519 of the application magnet valve device 483 to cause the application valve 517 to be moved downwardly to its seat against the bias of the spring 518, thus cutting off the flow of fluid under pressure from the main reservoir pipe 486 to the piston chamber 516 of the pressure operated rheostat device 385.

Should the rate of retardation of the vehicle continue to increase, the pendulum 499 will be moved further from the vertical position toward the left, thus causing the movable contact member 501 carried thereby to be likewise moved further toward the left and bias the spring contact member 502 into engagement with the spring contact member 503 to complete a circuit through the conductor 594 and the winding of the magnet 526 of the release magnet valve device 484, thus energizing the magnet 526 and causing it to move the release valve 524 downwardly against the force of the spring 525 to effect the release of fluid under pressure from the piston chamber 515 of the pressure operated rheostat device 485 to the atmosphere through the exhaust port 523, thus relieving the pressure on the upper side of the piston 527 and permitting the force of the magnet comprising the winding 531 and the core 529 to force the core 529, the stem 528, and the piston 527 upwardly until these forces are again in balance. Upon upward movement of the core 529 the spring 538 correspondingly moves the lever 532 and the contact member 535 carried thereby upwardly to introduce a greater portion of the resistor 537 in circuit between the positive terminal of the battery 592 and the train line conductor 599, thus correspondingly decreasing the energization of the winding 531 on the pressure operated rheostat, and the energization of the windings of the magnets 539 of the self-lapping magnet valve devices 489 that control the degree of application of the several braking units.

If the operator wishes to release the brakes the lever 495 is moved to the extreme left, or to its illustrated position, thus bringing the contact members 592 and 503 to their illustrated positions and continuing the completion of the circuits through the windings of the magnets 519 and 526, respectively, of the application magnet valve device 483, and the release magnet valve device 484, thus reducing the pressure within the piston chamber 516 of the pressure operative rheostat to atmospheric pressure and permitting the lever 532, and the contact member 535 carried thereby, to be moved upwardly sufficiently to interrupt the circuit from the battery 592 through the resistor 537 thus completely deenergizing the several magnets 539 of the self-lapping magnet valve device 489.

Upon the decrease in the energization of the magnet 539 of the self-lapping magnet valve device, the downward force of the core 541 is reduced, thus permitting the spring 561, acting on the underside of the inlet valve 555 and through the inlet valve stem 557 to the release valve 553 to force the inlet valve 555 and the release valve 553 upwardly until the valve 555 is brought into engagement with its seat, thus closing communication from the supply reservoir 490 to the diaphragm chamber 549, and through pipe 551 to the control valve device 392, the differential relay device 393, and the pressure regulator 7. During this upward movement of the valves 555 and 553, the spring 554 in the diaphragm chamber 549 is also acting against the stem 545 to aid in moving it upwardly as the downward pressure exerted by the core 541 is relieved. When the inlet valve 555 engages its seat, further movement of the inlet valve stem 557, and further upward movement of the release valve 553 closes, so that upon further upward movement of the stem 545, the release valve seat 552 is moved upwardly from the release valve 553, thus effecting communication from the diaphragm chamber 549 to the atmosphere through the outlet chamber 547 and the release port 548. The release of fluid under pressure as above described is effective to reduce the pressure in the main chamber 259 of the differential relay valve device 393, and in the piston chamber 158 of the pressure regulator 7, thus decreasing the degree of application of both the fluid pressure brakes, if applied, and after the pressure in the piston chamber 158 has decreased sufficiently that the force exerted on the piston 159 is less than the maximum force exerted by the spring 161, the degree of application of the dynamic brakes.

An emergency application of the brakes may be effected by a reduction in brake pipe pressure by any means, such as by the use of a conductor's valve, a rotary valve in the usual brake valve device, or the foot valve device 491 upon a release in the pressure on the lever 586 to effect a so called dead man operation of the brakes. Upon the release of pressure from the foot lever 586 of the foot valve device 491, the spring 589 forces the lever upwardly and the force of the spring 582, acting against the valve 579 forces that valve to its seat 581, and the valve stem 583, acting against the diaphragm 584, forces the diaphragm from its rib seat 585, thus closing communication from the main reservoir pipe 486 to the brake pipe 306, and effecting communication from the brake pipe 306 to the atmosphere through the outlet chamber 574 and the exhaust port 575 to effect a reduction in brake pipe pressure.

A reduction in brake pipe pressure effects a corresponding reduction in the pressure within the piston chamber 444 of the triple valve portion of the control valve device 392 to effect the operation of the brakes in the manner above described with respect to the system illustrated in Fig. 6 of the drawings.

A reduction in brake pipe pressure also effects a corresponding reduction in the pressure within the piston chamber 563 of the triple valve device 492, thus causing the piston 564 to move toward the left against the bias of the spring 571 and correspondingly move the piston stem 565 and the slide valve 566 to effect communication from the slide valve chamber 573 through pipe 568 to the piston chamber 494 of the retardation controller device 482, thus supplying fluid under pressure from the auxiliary reservoir 493 to the piston chamber 494 to effect the movement of the piston 509 and of the piston stem 511 toward the left against the bias of the spring 512. The left end of the stem 511 engages one side of the movable support member 504 carrying the contact members 502 and 503, rotating the support member 504 about the pivot pin 505 in a clockwise direction to interrupt the above traced circuits through the magnet windings of the application magnet valve device 483, and of the release magnet valve device 484, to effect the supply of fluid under pressure to the piston chamber 516 of the pressure operated rheostat device 485, and the consequent operation of the brakes through operation of the self-lapping magnet valve devices 489 associated with each braking unit of the train. It will be noted that the pivot pin 506 in the upper end of the support member 504 is inserted in an elongated opening 510 or slot in the connecting link 497 to permit the clockwise rotation of the member 504, and a corresponding movement of the pin 506 independently of the operation of the lever 495 of the brake valve device 481 from its release position. The movement of the supporting member 504 in a clockwise direction, when effected by the stem 511 in the manner above described causes a clockwise movement of the supporting member 504 to its extreme position, or until the pin 506 has reached the right hand end of the slot 510 in the link 497 corresponding to the maximum permissible rate of retardation of the vehicle permitted by the retardation controller 482.

Referring to the embodiment of the invention illustrated in Fig. 10, the system therein disclosed comprises a self-lapping brake valve device 603 that is adapted to control the flow of fluid under pressure from a main reservoir 604, as supplied by a reducing valve device 605 at a reduced pressure, through main reservoir pipe 606 to the supply pipe 607 to the piston chamber 141 of the retardation controller device 8, and through the magnet valve portion 608 and the brake controlling pipe 613 to the piston chamber 158 of the pressure regulator 7, and to the main chamber 259 of the differential relay valve device 303. The pressure regulator 7 is effective to operate a movable switch contact member 75 to transfer the operation of the power controlling relays 192 and 193 illustrated in Fig. 1 and the dynamic brake controlling relays 202 and 205 and to operate the rheostat arm 163 to control the degree of energization of the current limiting relays 169 and 171 also illustrated in Fig. 1 to control the degree of dynamic braking in accordance with the pressure within the piston chamber 158 in the manner described above.

The differential relay valve device 303 corresponds in construction and operation to that illustrated in Figs. 4, 5, 6 and 8, to control the flow of fluid under pressure to the brake cylinder 301 and the release of fluid under pressure thereform, in accordance with variations in pressure within the brake control pipe 613 and in the main chamber 259 of the differential relay valve device above a predetermined initial value necessary to effect communication between the main chamber 259 and the brake cylinder 301.

The magnet valve portion 608 comprises an application magnet valve device 609 and a release magnet valve device 611, that are controlled in accordance with the operation of the retardation controller device, which is similar in construction and operation to the retardation controller device illustrated in Figs. 1 and 3, and an inshot valve device 612 that is similar in construction and operation to the inshot valve device illustrated in Fig. 2.

The brake valve device 603 comprises a main body portion 614, a self-lapping valve portion 615, and a bottom or bracket portion 616. The self-lapping brake valve portion of the brake valve device may correspond in construction to the self-lapping valve portion 322 of the brake valve device 307 shown in Fig. 6 and the parts are therefore correspondingly numbered. The brake valve device may also be provided with a rotary valve in the lower portion thereof to effect automatic brake application upon a reduction in brake pipe pressure in the same manner as in the system illustrated and described in Fig. 6. The brake pipe 11 is connected to the lower piston chamber of the retardation controller device 8 in the same manner as illustrated in Figs. 1 and 3 to establish a maximum rate of retardation of the vehicle through operation of the retardation controller device 8 upon an emergency application of the brakes effected through a reduction in brake pipe pressure.

The application magnet valve device 609 of the magnet valve portion 608 comprises a casing 617 containing a chamber 618, that is in constant communication through passage and pipe 607 with the pressure chamber 324 of the brake valve device 603; and with an application valve chamber 619, that is in constant communication through passage and pipe 613 with the piston chamber 158 of the pressure regulator 7 and with the main chamber 259 of the differential relay valve device 303. An application valve 621 is provided in the application valve chamber 619 and is provided with a downwardly extending stem 620 that extends through a bore in the wall of the casing dividing the chambers 618 and 619. A spring 622 is provided within the lower chamber 618 for normally urging the application valve 621 upwardly from its seat, and with a magnet 623 in the upper part of the casing which, when energized, forces the valve 621 downwardly to its seat against the bias of the spring 622.

The release valve device 611 comprises a casing 610 containing a release valve chamber 624, that is in constant communication through passage and pipe 613 with the piston chamber 158 of the pressure regulator 7 and with the main chamber 259 of the differential relay magnet valve device 303, and is also provided with an outlet chamber 625 that is in constant communication with the atmosphere through the exhaust port 626. A release valve 627 is provided within the release valve chamber 624 for controlling communication between that chamber and the outlet chamber 625. A spring 628 is provided within the release valve chamber 624 for normally biasing the valve 627 upwardly to its seat, and a magnet 629 is provided in the upper part of the casing which, when energized forces the valve 627 downwardly from its seat against the force of the spring 628.

The inshot valve device 612 is provided with a valve chamber 631 that is in constant communication through passage 630 with the inlet chamber 618 of the application magnet valve device, and contains a ball valve 632 that is maintained in its unseated position by a stem 633 that extends upwardly from a piston 634 within a piston chamber 635 that is in constant communication, through passage 613, with the release valve chamber 624 and with the application valve chamber 619. A spring 636 is provided on the under side of the piston 634 to normally force the piston and the piston stem 633 upwardly to unseat the ball valve 632. The under side of the piston 634 is in constant open communication with the atmosphere through an exhaust port 637. When the pressure within the piston chamber 635 is below a predetermined value, a spring 636 maintains the piston 634 and the stem 633 in its upper or illustrated position.

If the operator wishes to make a service application of the brakes the brake valve handle 376 is moved from its release position an amount depending upon the desired degree of application of the brakes thus operating the self-lapping portion of the brake valve device in the manner above described with respect to Fig. 6 to permit the flow of fluid under pressure from the main reservoir 604 to the pressure chamber 324 of the brake valve device until the pressure builds up therein corresponding to the degree of movement of the brake valve lever 376 from its release position. As the pressure builds up within the pressure chamber 324 of the brake valve device, fluid under pressure flows therefrom to the piston chamber 141 of the retardation controller device 8, and to the piston chamber 158 of the pressure regulator 7 and also to the main chamber 259 of the differential relay valve device 303, through the supply pipe 607, the magnet valve portion 608 and the brake controlling pipe 613. The flow of fluid under pressure from pipe 607 to the brake controlling pipe 613 has, in the initial state of the flow, two paths, one through the inlet chamber 618, past the unseated valve 621 to the application valve chamber 619, passage and pipe 613, the other from the passage 607, through passage 630, the ball valve chamber 631, past the unseated ball valve 632 to passage and pipe 613. As the pressure builds up within the passage 613 it correspondingly builds up within the piston chamber 635 of the inshot valve device until the pressure on the upper side of the piston 634 has increased sufficiently to overcome the upward force of the spring 636, and force the piston 634 and stem 633 downwardly, permitting the ball valve 632 to seat, and to thus cut off the further flow of fluid under pressure from the passage and pipe 607 to the passage and pipe 613 through the ball valve chamber 631. Fluid under pressure will continue to flow from the passage and pipe 607 to the passage and pipe 613 through the chamber 618 and the application valve chamber 619 to increase the pressure within the piston chamber 158 of the pressure regulating device 7, and in the main chamber 259 of the differential relay valve device 303, to increase the degree of application of the brakes in the manner above described with respect to Fig. 6, until the rate of retardation of the vehicle has become sufficient that the operation of the retardation controller device 8 becomes effective to limit the pressure within the brake controlling pipe 613, or until the pressure within that pipe has built up to the pressure within the pressure chamber 324 of the brake valve device, if this pressure corresponds to a degree of application of the brakes that is within the permitted rate of retardation of the vehicle.

If the rate of retardation of the vehicle becomes sufficient to move the pendulum 124 toward the left until the contact member 126, carried thereby, engages the contact member 127, a circuit will be closed from the positive terminal of the battery 637 through the contact members 126 and 127, conductor 638, the winding of the magnet 623 of the application magnet valve device 609, to ground at 639, and to the grounded terminal 641 of the battery 637, thus energizing the winding of the magnet 623 and causing it to move the application valve 621 downwardly to its seat to cut off the further flow of fluid under pressure to the brake controlling pipe 613. If the rate of retardation of the vehicle further increases, the pendulum 124 will be moved further toward the left until the contact member 126 thereof engages the contact member 128, thus completing a circuit from the positive terminal of the battery 637 through contact members 126, 128, the conductor 642, the winding of the magnet 629 to ground at 639, and to the grounded terminal 641 of the battery 637 to complete a circuit through the winding of the magnet 629 of the release magnet valve device 611, thus forcing the release valve 627 downwardly from its seat to effect the release of fluid under pressure from the piston chamber 158, and from the main chamber 259 of the differential relay valve device, to the atmosphere through the exhaust port 626 to decrease the degree of application of the brakes.

In view of the similarity of the parts making up the system illustrated in Fig. 10 with the corresponding parts of the other systems previously described it is believed that further detailed description of the system illustrated in Fig. 10 is unnecessary.

Referring to Fig. 11 a modified relay valve device 643 is illustrated which may be employed in any of the systems illustrated in Figs. 4, 6, 8 and 10 in which fluid pressure is simultaneously supplied to the main pressure chamber 259 of the differential valve device and to the piston chamber 158 of the pressure regulator for regulating the dynamic braking, and in which the pressure regulator 7 corresponds to that illustrated in Fig. 1 in that it controls a rheostat arm 163, for varying the resistance of a resistor 165 in circuit with the car limiting relays 169 and 171 as illustrated in Fig. 1 for the purpose of controlling a dynamic braking rheostat 9 in the manner therein illustrated, to maintain a constant dynamic braking current within the dynamic braking circuit so long as the capacity of the motors is sufficient to maintain the desired degree of dynamic braking.

The main chamber 259, the diaphragm 261 and the slide valve 266 actuated by the stem 264 that is connected with the diaphragm are the same in construction and operation as are the corresponding parts of the differential relay valve device described in Figs. 4, 6, 8 and 10, but, in the differential valve device 643, instead of employing a second diaphragm 271 and the graduating stem 272 that is maintained in position by a spring 273, as illustrated in the figures above referred to, an electromagnet is provided having a core 644 provided with a stem 645 that extends through a bore 652 in a partition wall 653 and engages the main diaphragm 261. An energizing winding 646 is provided and is connected by conductors 647 and 648 to the opposite ends of a shunt 649, connected in the dynamic braking circuit, so that variations in the degree of energization of the windings 646 will correspond to variations in the dynamic braking current flowing through the dynamic braking rheostat 9.

During the application of the brakes, as the fluid pressure builds up in the pipe 651 supplying fluid under pressure to the piston chamber 158 of the pressure operated rheostat 7 and to the main chamber 259 of the differential relay valve device of the solenoid loaded relay 643, the piston 159 and stem 162 of the pressure regulator 7 are immediately moved toward the right to effect application of the dynamic brakes and as the lever 163 is moved across the rheostat 165 to increase the current in the dynamic braking circuit. As this current builds up, the current in the solenoid 646 of the solenoid loaded relay correspondingly builds up and increases the force of the magnet core 644 toward the right against the force of the pressure in the main chamber 259 on the left of the diaphragm 261. After the dynamic braking current has built up to its maximum value, the force of the solenoid 646 exerted by the stem 645 on the right of the diaphragm 261 will no longer increase, so that, upon a further increase in the fluid pressure within the main chamber 259 of the relay valve device 643, the diaphragm 261 and the slide valve 266 will be moved toward the right to effect communication between the main chamber 259 and the brake cylinder 301 to effect an application of the fluid pressure brakes.

The essential difference between the relay valve device 643 illustrated in Fig. 11 and the relay valve devices 303 illustrated in Figs. 4, 5, 6, 8 and 10 is that the force exerted against the main diaphragm 261 while the pressure is building up within the main pressure chamber 259 is a variable instead of a fixed force and that it is determined by the dynamic braking current. It will be noted that when fluid under pressure flows from the main chamber 259 to the brake cylinder 301 it also flows through passage 263 to the auxiliary chamber 262 on the right of the diaphragm 261 thus bringing the pressure in the chamber 262 more nearly to the same value as the pressure within the main chamber 259. The ratio between the pressures in the chambers 259 and 262 will not be determined solely by the pressure within the main chamber 259 as in the previously described differential relay valve devices 303, but will be dependent upon the degree of energization of the winding 646. If, for any reason, the dynamic braking circuit fails, so that no current is passing through the dynamic braking circuit, and consequently no current is passing through the winding 646 of the solenoid loaded relay, no force will be exerted by the stem 645 on the right side of the diaphragm 261 and as the pressure in the pipe 651 builds up within the main chamber 259, it will correspondingly build up in the brake cylinder 301, thus permitting an immediate application of the fluid pressure brakes without the necessity of pressure in the main chamber 259 of the relay valve device first building up to a predetermined value to overcome a fixed resistance of the movement of the diaphragm 261 toward the right, to move the slide valve 266 to a brake applying position.

While several preferred embodiments of my invention have been illustrated and described it will be apparent to those skilled in the art that many modifications and changes in the apparatus and circuits illustrated may be made within the spirit of my invention and I do not wish to be limited otherwise than by the scope of the appended claims.

Having now described my invention, what I claim as new and desire to secure by Letters Patent is:

1. In a brake equipment for vehicles, in combination, fluid pressure braking means, an electric dynamic braking means, a brake control pipe, means comprising a brake valve device and a control valve device for controlling the supply of fluid under pressure to said brake control pipe to effect a pressure therein corresponding to a desired degree of braking, a retardation control device for limiting the application of said fluid pressure brake in accordance with the rate of retardation of the vehicle, means responsive to pressure in said control pipe for controlling the degree of application of said dynamic braking means, and means responsive to the pressure in said brake control pipe for controlling the setting of said retardation control device.

2. In a brake equipment for vehicles, in combination, fluid pressure braking means, an electric dynamic braking means, a brake control pipe, means comprising a brake valve device for controlling the supply of fluid under pressure to said fluid pressure braking means and to said brake control pipe to effect a pressure therein corresponding to a desired degree of braking, a retardation controlled device for limiting the application of said fluid pressure brake in accordance with a desired rate of retardation of the vehicles, means for preventing a release of the fluid pressure brakes by said retardation controller device below a predetermined amount, means responsive to the pressure in said control pipe for controlling the degree of application of said dynamic braking means, and means responsive to the pressure in said brake control pipe for controlling the setting of said retardation controller device.

3. In a brake equipment for vehicles, in combination, fluid pressure braking means, an electric dynamic braking means, a control valve device, means comprising a brake valve device for controlling the supply of fluid under pressure through said control valve device to effect a pressure corresponding to the desired degree of braking, said control valve device having a magnet valve portion for limiting the flow of fluid under pressure through said control valve device, means responsive to the pressure of fluid flowing from said control valve device through said magnet valve portions for controlling said dynamic braking means, means responsive to the pressure of fluid flowing from said control valve device through said magnet valve portion for controlling said fluid pressure braking means, a retardation control device operative in response to a desired rate of retardation of the vehicles for controlling the magnet valve portion to control the pressure supplied to said dynamic brake controlling means and to said fluid pressure brake controlling means.

4. In a brake equipment for vehicles, in combination, fluid pressure braking means, an electric dynamic braking means, a control valve device, means comprising a brake valve device for controlling the supply of fluid under pressure through said control valve device to effect a pressure corresponding to a desired degree of braking, said control valve device having a magnet valve portion for limiting the flow of fluid under pressure through said control valve device, means responsive to the pressure of fluid flowing from said control valve device through said magnet valve portion for controlling said dynamic braking means, means responsive to the pressure of fluid flowing from said control valve device through said magnet valve portion for controlling said fluid pressure braking means, a retardation control device operative in responsive to a desired rate of retardation of the vehicle for controlling the magnet valve portion to control the pressure supplied to said dynamic brake controlling means and to said fluid pressure brake controlling means, and means responsive to the pressure of fluid supplied to said magnet valve portion for adjusting the setting of the retardation control device.

5. In a brake equipment for vehicles, in combination, a brake cylinder, vehicle motors adapted to be operated as a dynamic braking means, means comprising a brake valve device for controlling the supply of fluid under pressure to a brake control passage, means responsive to the pressure in said brake control passage for controlling the degree of braking effect produced by said motors when operating as a dynamic braking means, a differential relay valve device responsive to the pressure in said brake control passage for controlling the supply of fluid under pressure to said brake cylinder, said differential relay valve device being so designed as to prevent the flow of fluid under pressure to said brake cylinder until the pressure in said brake control passage has increased to a value corresponding substantially to the full degree of dynamic braking effect.

6. In a brake equipment for vehicles, in combination, a brake cylinder, an electric dynamic braking means, a control valve device having a magnet valve portion, means comprising a brake valve device for controlling the supply of fluid under pressure to said magnet valve portion and therethrough to a brake controlling passage, means responsive to the pressure in said brake controlling passage for controlling the degree of application of said dynamic braking means, a differential relay valve device responsive to the pressure in said brake control passage for controlling the supply of fluid under pressure to said brake cylinder, said differential relay valve device being so designed as to prevent the flow of fluid under pressure to said brake cylinder until the pressure in said brake control passage has increased to a value corresponding substantially to full application of the dynamic braking means, a retardation control device responsive to the rate of retardation of the vehicle for controlling said magnet valve portion to control the pressure within said brake control passage.

7. In a brake equipment for vehicles, in combination, a brake cylinder, an electric dynamic braking means, a control valve device having a magnet valve portion, means comprising a brake valve device for controlling the supply of fluid under pressure to said magnet valve portion and therethrough to a brake control passage, means responsive to the pressure in said brake control passage for controlling the degree of application of said dynamic braking means, a differential relay valve device responsive to the pressure in said brake control passage for controlling the supply of fluid under pressure to said brake cylinder, said differential relay valve device being so designed as to prevent the flow of fluid under pressure to said brake cylinder until the pressure in said brake control passage has increased to a value corresponding substantially to full application of the dynamic braking means, a retardation control device responsive to the rate of retardation of the vehicle for controlling said magnet valve portion to control the pressure within said brake control passage, and means responsive to the pressure of fluid supplied to said magnet valve portion for adjusting the setting of said retardation control device to effect a desired rate of retardation of the vehicle.

8. In a brake equipment for vehicles, in combination, a brake cylinder, an electric dynamic braking means, means comprising a brake valve device for controlling the supply of fluid under pressure to a brake control passage, means comprising electric circuits for controlling the application of said dynamic braking means, means responsive to the pressure in said brake control passage for controlling the degree of application of said dynamic brake means, a differential relay valve device responsive to the pressure in said brake control passage for controlling the supply of fluid under pressure to said brake cylinder, said differential relay valve device being so designed as to prevent the flow of fluid under pressure to said brake cylinder until the pressure in said brake control passage has increased to a value corresponding substantially to full application of the dynamic braking means, and means responsive to a failure in said electric circuits for supplying fluid under pressure to said brake cylinder independently of said relay valve device.

9. In a brake equipment for vehicles, in combination, a brake cylinder, an electric dynamic braking means, means comprising a brake valve device for controlling the supply of fluid under pressure to a brake control passage to effect a service application of the brakes, means responsive to the pressure in said brake control passage for controlling the degree of application of said dynamic braking means, a differential relay valve device responsive to the pressure in said brake control passage for controlling the supply of fluid under pressure to said brake cylinder, said differential relay valve device being so designed as to prevent the flow of fluid under pressure to said brake cylinder until the pressure in said brake control passage has increased to a value corresponding substantially to the full application of the dynamic braking means, and means including a triple valve device for controlling the supply of fluid under pressure to said brake cylinders to effect an emergency application of the brake independently of the differential relay valve device.

10. In a brake equipment for vehicles, in combination, a brake cylinder, an electric dynamic braking means, means comprising a brake valve device for controlling the supply of fluid under pressure to a brake control passage, means responsive to the pressure in said brake control passage for controlling the degree of application of said dynamic braking means, and means responsive to the pressure in said brake control passage and to the dynamic braking current for controlling the pressure in said brake cylinder to effect a total braking force corresponding to the pressure in said brake control passage.

11. In a brake equipment for vehicles, in combination, a brake cylinder, an electric dynamic braking means, means comprising a brake valve device for controlling the supply of fluid under pressure to a brake control passage, means responsive to the pressure in said brake control passage for controlling the degree of application of said dynamic braking means, a differential relay valve device responsive to the pressure in said brake control passage for controlling the supply of fluid under pressure to said brake cylinder, said differential relay valve device having a solenoid loaded valve therein responsive to the pressure in said brake control passage and opposed by said solenoid in accordance with the dynamic braking current for controlling the pressure in said brake cylinder to effect a total braking force corresponding to the pressure in said brake control passage.

12. In a brake equipment for vehicles, in combination, a brake cylinder, means comprising a brake valve device for controlling the supply of fluid under pressure to a brake control passage, an electrical dynamic brake comprising a braking rheostat and means for operating said braking rheostat to permit a predetermined dynamic braking current therethrough comprising current regulating relay means subject to an increase or decrease in the current in said dynamic braking circuit for effecting the operation of said rheostat in the one or in the other direction to control the flow of current therethrough, and a pressure regulator comprising a regulating rheostat in circuit with said current limiting relays, and means responsive to the pressure in said brake control passage for varying the setting of said regulating rheostat to correspondingly vary the dynamic braking current.

13. In a brake equipment for vehicles, in combination, a plurality of braking units each comprising a brake cylinder, an electric dynamic braking means, a control valve device having a self-lapping magnet valve portion for controlling the supply of fluid to a brake control passage at a pressure dependent upon the degree of energization thereof, a check valve portion connected between the outlet of said self-lapping magnet valve portion and said brake control passage for limiting the flow of fluid therethrough and for applying the dynamic braking means at a predetermined pressure, and a magnet valve portion for controlling the further supply of fluid under pressure to said brake control passage independently of said check valve portion, means responsive to the pressure in said brake control passage for controlling the degree of application of said dynamic brakes, and means responsive to the pressure in said brake control passage for controlling the pressure in said brake cylinder, a retardation control device responsive to the rate of retardation of said vehicle for controlling said magnet valve portion to vary the pressure in said brake control passage for controlling the degree of application of the brakes, and means responsive to the pressure supplied by said self-lapping magnet valve portion for varying the setting of said retardation control device.

14. In a brake equipment for vehicles, in combination, a plurality of braking units each comprising a brake cylinder, an electric dynamic braking means, a control valve device having a self-lapping magnet valve portion for controlling the supply of fluid to a brake control passage at a pressure determined in accordance with the degree of energization thereof, a check valve portion connected between the outlet of said self-lapping magnet valve portion and said brake cylinder for limiting the flow of fluid therethrough and for applying the dynamic braking means at a predetermined pressure, and a magnet valve portion for controlling the further supply of fluid under pressure to said brake cylinder independently of said check valve portion, means responsive to the pressure supplied to said check valve portion for controlling the degree of application of said dynamic brake, means responsive to the pressure supplied to said check valve portion for controlling the pressure in said brake cylinder, a retardation control device responsive to the rate of retardation of said vehicle for controlling said magnet valve portion to vary the pressure in said brake cylinder for controlling the degree of application of the brakes, and means responsive to the pressure supplied to said check valve device for varying the setting of said retardation control device.

15. In a brake equipment for vehicles, in combination, a brake cylinder, an electric dynamic braking means, means comprising a brake valve device for controlling the supply of fluid under pressure to a brake control passage, means responsive to the pressure in said brake control passage for controlling the degree of application of said dynamic braking means, a differential relay valve device responsive to the pressure in said brake control passage for controlling the supply of fluid under pressure to said brake cylinder, said differential relay valve being so designed as to prevent the flow of fluid under pressure to said brake cylinder until the pressure in said brake control passage has increased to a value corresponding to a predetermined application of said dynamic braking means, and thereafter to control the supply of fluid under pressure to the brake cylinder to cause the brake cylinder pressure to build up at a rate substantially in excess of the rate of increase in pressure supplied to said differential relay valve device.

16. In a brake equipment for vehicles, in combination, a brake cylinder, an electric dynamic braking means, a control valve device having a magnet valve portion, means comprising a brake valve device for controlling the supply of fluid under pressure to said magnet valve portion and therethrough to a brake controlling passage, means responsive to the pressure in said brake controlling passage for controlling the degree of application of said dynamic braking means, a differential relay valve device responsive to the pressure in said brake control passage for controlling the supply of fluid under pressure to said brake cylinder, said differential relay valve device being so designed as to prevent the flow of fluid under pressure to said brake cylinder until the pressure in said brake control passage has increased to a value corresponding to a predetermined application of said dynamic braking means, and thereafter to control the supply of fluid under pressure to the brake cylinder to cause the pressure in the brake cylinder to build up at a rate substantially in excess of the rate of increase in pressure supplied to said differential relay valve device, and a retardation control device responsive to rate of retardation of the vehicle for controlling said magnet valve portion to control the pressure within said brake control passage.

17. In a brake equipment for vehicles, in combination, a brake cylinder, an electric dynamic braking means, a control valve device having a magnet valve portion, means for controlling said magnet valve portion comprising a straight air pipe, a control pipe, a master control differential relay device having two pressure chambers therein one of which is in constant open communication with said straight air pipe and the other of which is in constant open communication with said control pipe, a brake valve device for controlling the supply of fluid under pressure to said control pipe to effect a pressure therein corresponding to the desired degree of braking, said master control differential relay device being responsive to the differential pressures between said control pipe and said straight air pipe to control said magnet valve portion to control the supply of fluid under pressure to said straight air pipe, means responsive to the pressure in said straight air pipe for controlling the degree of application of said dynamic braking means, a differential relay valve device responsive to the pressure in said straight air pipe for controlling the supply of fluid under pressure to said brake cylinder, said differential relay valve device being so designed as to prevent the flow of fluid under pressure to said brake cylinder until the pressure in said straight air pipe has increased to a value corresponding to a predetermined application of said dynamic braking means.

18. In a brake equipment for vehicles, in combination, a plurality of braking units each comprising a brake cylinder, an electric dynamic braking means, and a control valve device having a magnet valve portion, means for controlling said several magnet valve portions comprising a straight air pipe, a control pipe, and a master control differential relay device having two chambers one of which is in constant open communication with said straight air pipe and the other of which is in constant open communication with said control pipe, a brake valve device for controlling the supply of fluid under pressure to said control pipe to effect a pressure therein corresponding to the desired degree of braking, said master control differential relay device being responsive to the differential pressure between said control pipe and said straight air pipe to control the several magnet valve portions of said several braking units for individually effecting the supply of fluid under pressure to said straight air pipe, means associated with each braking unit responsive to the pressure in said straight air pipe for controlling the degree of application of its associated dynamic braking means, a differential relay valve device associated with each braking unit responsive to the pressure in said straight air pipe for controlling the supply of fluid under pressure to the associated brake cylinder, said differential relay valve device being so designed as to prevent the flow of fluid under pressure to said brake cylinder until the pressure in said straight air pipe has increased to a value corresponding substantially to full application of the dynamic braking means.

19. In a brake equipment for vehicles, in combination, fluid pressure braking means, an electric braking means, manually controlled means for supplying fluid under pressure to effect a fluid pressure application of the brakes, means operative upon the initial supply of fluid to effect a fluid pressure application of the brakes and to cut said electric braking means into operation, a retardation controller responsive to changes in the rate of deceleration of the vehicle for also controlling the supply of fluid under pressure to effect a fluid pressure application of the brakes, and means operated according to the pressure of fluid supplied by said manually controlled means for varying the response of said retardation controller.

20. In a brake equipment for vehicles, in combination, a dynamic braking means, a brake cylinder, electrically controlled means for supplying fluid under pressure to the brake cylinder at a pressure which varies according to the degree of energization thereof, manually controlled means for varying the degree of energization of said electrically controlled means, and means operated upon the initial supply of fluid under pressure by said electrically controlled means for cutting said dynamic brake into operation.

21. In a brake equipment for vehicles, in combination, a dynamic braking means, a brake cylinder, electrically controlled means for supplying fluid under pressure to the brake cylinder at a pressure which varies according to the degree of energization, manually controlled means for varying the degree of energization of said electrically controlled means, means operated upon the initial supply of fluid under pressure by said electrically controlled means for cutting said dynamic brake into operation, and means for varying the degree of braking effected by said dynamic brake in accordance with the degree of pressure of fluid supplied by said electrically controlled means.

22. In a brake equipment for vehicles, in combination, an electric braking means, manually controlled means for supplying fluid under pressure to effect a fluid pressure application of the brakes, means operated upon the initial supply of fluid under pressure by said manually controlled means for cutting said electric braking means into operation and for closing a communication through which said fluid under pressure is supplied to effect a fluid pressure application of the brakes, and means operative a predetermined time after said manually controlled means is operated to supply fluid under pressure to establish a communication through which fluid under pressure is supplied to effect a fluid pressure application of the brakes.

23. In a vehicle brake system, in combination, fluid pressure braking means, electric braking means, means for controlling said fluid pressure braking means according to the application of said electric braking means, fluid pressure operated means for controlling the application of said electric braking means, electropneumatic means for supplying fluid under pressure to operate said fluid pressure operated means, and automatic means for also supplying fluid under pressure to operate said fluid pressure operated means, and selective means for selecting between said two supplies.

24. In a vehicle brake system, in combination, electric braking means, a brake pipe, means operated upon a reduction in brake pipe pressure for closing a circuit to render said electric braking means effective to produce a braking effect, means for controlling the degree of braking effect produced by said electric braking means, and means also operated upon a reduction in brake pipe pressure for effecting operation of said last named means.

25. In a brake equipment for vehicles, in combination, a brake cylinder, dynamic braking means, means comprising a brake valve device for controlling the supply of fluid under pressure to a brake control passage, means comprising electric circuits controlled in response to the pressure in said brake control passage for controlling the degree of application of said dynamic braking means, a differential relay valve device responsive to the pressure in said brake control passage for controlling the supply of fluid under pressure to said brake cylinder, said differential relay valve device being so designed as to prevent the flow of fluid under pressure to said brake cylinder until the pressure in said brake control passage has increased to a value corresponding substantially to full application of said dynamic braking means, and magnet valve means responsive to a failure in said electric circuits for effecting the supply of fluid under pressure to said brake cylinders independently of said relay valve device.

26. In a brake equipment for vehicles, in combination, a brake cylinder, dynamic braking means, control means therefor comprising electric circuits, a control valve device having a magnet valve portion, means comprising a brake valve device for controlling the supply of fluid under pressure to said magnet valve portion and therethrough to a brake controlling passage, means responsive to the pressure in said brake controlling passage for controlling the degree of application of said dynamic braking means, a differential relay valve device responsive to the pressure in said brake control passage for controlling the supply of fluid under pressure to said brake cylinder, said differential relay valve device being so designed as to prevent the flow of fluid under pressure to said brake cylinder until the pressure in said brake control passage has increased to a value corresponding substantially to full application of the dynamic braking means, means responsive to a failure in said electric circuits for applying the dynamic brakes to effect the supply of fluid under pressure to said brake cylinder independently of said relay valve device, and a retardation control device responsive to the rate of retardation of the vehicle for controlling said magnet valve portion to control the pressure within said brake control passage.

27. In a brake equipment for vehicles, in combination, a brake cylinder, dynamic braking means, means comprising electric circuits for controlling the application of said dynamic braking means, a control valve device having a magnet valve portion, means comprising a brake valve device for controlling the supply of fluid under pressure to said magnet valve portion and therethrough to a brake control passage, means responsive to the pressure in said brake control passage for controlling the degree of application of said dynamic brakes, a differential relay valve device responsive to the pressure in said brake control passage for controlling the supply of fluid under pressure to said brake cylinder, said differential relay valve device being so designed as to prevent the flow of fluid under pressure to said brake cylinder until the pressure in said brake control passage has decreased to a value corresponding substantially to full application of the dynamic braking means, magnet valve means responsive to a failure in the electric circuits for controlling the application of said dynamic braking means for effecting the supply of fluid under pressure to said brake cylinder independently of the operation of said relay valve device, a retardation control device responsive to the rate of retardation of the vehicle for controlling the magnet valve portion to control the pressure within said brake control passage, and means responsive to the pressure of fluid supplied to said magnet valve portion for adjusting the setting of said retardation control device to effect a desired rate of retardation of the vehicle.

28. In a brake equipment for vehicles, in combination, a brake cylinder, dynamic braking means, means comprising a brake valve device for controlling the supply of fluid under pressure to a brake control passage to effect a service application of the brakes, means responsive to the pressure in said brake control passage for controlling the degree of application of said dynamic braking means, a differential relay valve device responsive to the pressure in said brake control passage for controlling the supply of fluid under pressure to said brake cylinder, said differential relay valve device being so designed as to prevent the flow of fluid under pressure to said brake cylinder until the pressure in said brake control passage has increased to a value corresponding substantially to full application of the dynamic braking means, means including a triple valve device for controlling the supply of fluid under pressure to said brake cylinder to effect an emergency application of the brakes independently of the differential relay valve device, a by-pass valve for normally closing communication for effecting the supply of fluid under pressure to said brake cylinder, and means responsive to the operation of said triple valve to a brake applying position for operating said by-pass valve to effect communication to said brake cylinder independently of the operation of said relay valve device.

29. In a brake equipment for vehicles, in combination, a brake cylinder, dynamic braking means, means comprising a brake valve device for controlling the supply of fluid under pressure to a brake control passage to effect the service application of the brakes, means responsive to the pressure in said brake control passage for controlling the degree of application of said dynamic braking means, a differential relay valve device responsive to the pressure in said brake control passage for controlling the supply of fluid under pressure to said brake cylinder, said differential relay valve device being so designed as to prevent the flow of fluid under pressure to said brake cylinder until the pressure in said brake control passage has increased to a value corresponding substantially to the full application of the dynamic brake means, means including a triple valve device for controlling the supply of fluid under pressure to said brake cylinder to effect an emergency application of the brake independently of the differential relay valve device, a by-pass magnet valve device normally energized for closing communication between said brake controlling passage and said brake cylinder, and a pressure operated switch subject to the operation of said triple valve device to a brake applying position for controlling the operation of said by-pass magnet valve device to effect communication between said brake controlling passage and said brake cylinder independently of the operation of said relay valve device.

30. In a brake equipment for vehicles, in combination, a brake cylinder, dynamic braking means, means comprising a brake valve device and a self-lapping magnet valve device for controlling the supply of fluid under pressure to a brake control passage, means comprising an electric circuit for controlling the application of said dynamic braking means, switch means responsive to the pressure in said brake control passage for controlling said circuit to effect the application and release of the brakes, and means responsive to the pressure in said brake control passage for controlling the degree of application of said dynamic brake means, a differential relay valve device responsive to the pressure in said brake control passage for controlling the supply of fluid under pressure to said brake cylinder, said differential relay valve device being so designed as to prevent the flow of fluid under pressure to said brake cylinder until the pressure in said brake control passage has increased to a value corresponding substantially to full application of the dynamic brake means, a by-pass magnet valve device normally energized to close communication between said brake control passage and said brake cylinder and operative when energized to effect such communication independently of said relay valve device, a brake pipe and automatic valve means subject to a reduction in brake pipe pressure for controlling the supply of fluid under pressure to said brake controlling passage independently of said self-lapping magnet valve device and for interrupting the energization of said by-pass magnet valve device to effect the supply of fluid under pressure from said brake control passage to said brake cylinder independently of said relay valve device.

31. In a brake equipment for vehicles, in combination, a brake cylinder, an electric braking means comprising the vehicle driving motors connected to operate as generators, means for controlling the supply of fluid under pressure to effect a control pressure corresponding to the desired degree of braking, automatic means operative over a predetermined range of control pressures for effecting a degree of application of said electric braking means in accordance with the degree of the control pressure and arranged to effect a maximum application thereof appreciably below the maximum control pressure, and means for effecting the supply of fluid under pressure to said brake cylinder over a predetermined range of said control pressures extending above the value necessary to effect maximum application of the electric braking means.

32. In a brake equipment for vehicles, in combination, a brake cylinder, an electric braking means comprising the vehicle driving motors connected to operate as generators, means for controlling the supply of fluid under pressure to effect a control pressure corresponding to the desired degree of braking, automatic means operative over a predetermined range of control pressures for effecting a degree of application of said electric braking means in accordance with the degree of control pressure and arranged to effect the maximum application thereof appreciably below the maximum control pressure, means for effecting the supply of fluid under pressure to said brake cylinder over a predetermined pressure range of said control pressures extending above the value necessary to effect maximum application of the electric braking means, and means responsive to the rate of retardation of the vehicle for limiting the total braking effect produced by said electric braking means and said brake cylinder.

SIDNEY G. DOWN.